(12) United States Patent
Oehring et al.

(10) Patent No.: US 12,092,095 B2
(45) Date of Patent: Sep. 17, 2024

(54) CONSTANT VOLTAGE POWER DISTRIBUTION SYSTEM FOR USE WITH AN ELECTRIC HYDRAULIC FRACTURING SYSTEM

(71) Applicant: U.S. Well Services, LLC, Houston, TX (US)

(72) Inventors: Jared Oehring, Houston, TX (US); Brandon N. Hinderliter, Houston, TX (US)

(73) Assignee: US Well Services, LLC, Houston, TX (US)

( * ) Notice: Subject to any disclaimer, the term of this patent is extended or adjusted under 35 U.S.C. 154(b) by 0 days.

(21) Appl. No.: 18/508,588

(22) Filed: Nov. 14, 2023

(65) Prior Publication Data

US 2024/0159235 A1    May 16, 2024

Related U.S. Application Data

(63) Continuation of application No. 18/097,574, filed on Jan. 17, 2023, now Pat. No. 11,815,082, which is a (Continued)

(51) Int. Cl.
*F04B 49/06* (2006.01)
*E21B 43/26* (2006.01)
(Continued)

(52) U.S. Cl.
CPC .......... *F04B 49/06* (2013.01); *E21B 43/2607* (2020.05); *F01D 15/08* (2013.01);
(Continued)

(58) Field of Classification Search
CPC ........ F04B 49/06; H02P 29/032; H02P 27/04; E21B 43/2607; E21B 43/26; F01D 15/08;
(Continued)

(56) References Cited

U.S. PATENT DOCUMENTS

| 1,541,601 A | 6/1925 | Tribe |
| 1,656,861 A | 1/1928 | Leonard |

(Continued)

FOREIGN PATENT DOCUMENTS

| AU | 2007340913 A1 | 7/2008 |
| CA | 2406801 A1 | 11/2001 |

(Continued)

OTHER PUBLICATIONS

Non-Final Office Action issued in corresponding U.S. Appl. No. 15/356,436, dated Oct. 26, 2020.
(Continued)

*Primary Examiner* — Alfonso Perez Borroto
(74) *Attorney, Agent, or Firm* — Hogan Lovells US LLP

(57) ABSTRACT

A hydraulic fracturing system includes a turbine generator for producing electricity at a well site, the turbine generator producing electrical energy at a voltage. The system also includes an electric pump electrically coupled to the turbine generator and receiving operative power from the turbine generator. The system further includes switch gear arranged between the electric pump and the turbine generator, the switch gear distributing electrical energy from the turbine generator to the electric pump, wherein the voltage remains substantially constant from the turbine generator to the electric pump.

20 Claims, 8 Drawing Sheets

Related U.S. Application Data continuation of application No. 17/533,183, filed on Nov. 23, 2021, now Pat. No. 11,555,491, which is a continuation of application No. 15/829,419, filed on Dec. 1, 2017, now Pat. No. 11,181,107.

(60) Provisional application No. 62/429,499, filed on Dec. 2, 2016.

(51) Int. Cl.

| | | |
|---|---|---|
| *F01D 15/08* | (2006.01) | |
| *F01D 15/10* | (2006.01) | |
| *F04B 15/02* | (2006.01) | |
| *F04B 17/03* | (2006.01) | |
| *F04B 23/00* | (2006.01) | |
| *H02J 3/38* | (2006.01) | |
| *H02K 7/18* | (2006.01) | |
| *H02P 27/04* | (2016.01) | |
| *H02P 29/032* | (2016.01) | |
| *F04B 49/20* | (2006.01) | |
| *H02J 11/00* | (2006.01) | |

(52) U.S. Cl.
CPC .............. *F01D 15/10* (2013.01); *F04B 15/02* (2013.01); *F04B 17/03* (2013.01); *F04B 23/00* (2013.01); *H02J 3/38* (2013.01); *H02K 7/1823* (2013.01); *H02P 27/04* (2013.01); *H02P 29/032* (2016.02); *E21B 43/26* (2013.01); *F04B 49/20* (2013.01); *H02J 3/381* (2013.01); *H02J 11/00* (2013.01)

(58) Field of Classification Search
CPC .. F01D 15/10; H02J 3/38; H02J 11/00; H02K 7/1823
USPC .......................................................... 307/17
See application file for complete search history.

(56) References Cited

U.S. PATENT DOCUMENTS

| | | |
|---|---|---|
| 1,671,436 A | 5/1928 | Melott |
| 1,743,771 A | 1/1930 | Hall et al. |
| 1,967,466 A | 7/1934 | Damsel |
| 2,004,077 A | 6/1935 | McCartney et al. |
| 2,183,364 A | 12/1939 | Bailey |
| 2,220,622 A | 11/1940 | Homer |
| 2,237,812 A | 4/1941 | De Blieux et al. |
| 2,248,051 A | 7/1941 | Armstrong |
| 2,407,796 A | 9/1946 | Page |
| 2,416,848 A | 3/1947 | Stewart |
| 2,610,741 A | 9/1952 | Schmid |
| 2,753,940 A | 7/1956 | Bonner |
| 2,852,600 A | 9/1958 | Jenkins, Jr. |
| 3,055,682 A | 9/1962 | Bacher et al. |
| 3,061,039 A | 10/1962 | Peters |
| 3,066,503 A | 12/1962 | Fleming et al. |
| 3,116,086 A | 12/1963 | Barengoltz |
| 3,302,069 A | 1/1967 | Webster |
| 3,334,495 A | 8/1967 | Jensen et al. |
| 3,347,570 A | 10/1967 | Roessler |
| 3,722,595 A | 3/1973 | Kiel |
| 3,764,233 A | 10/1973 | Strickland |
| 3,773,140 A | 11/1973 | Mahajan et al. |
| 3,794,846 A | 2/1974 | Schlicher et al. |
| 3,837,179 A | 9/1974 | Barth |
| 3,849,662 A | 11/1974 | Blaskowski et al. |
| 3,878,884 A | 4/1975 | Raleigh |
| 3,881,551 A | 5/1975 | Terry et al. |
| 3,967,841 A | 7/1976 | Kendrick et al. |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,432,064 A | 2/1984 | Barker et al. |
| 4,442,665 A | 4/1984 | Fick et al. |
| 4,456,092 A | 6/1984 | Kubozuka et al. |
| 4,506,982 A | 3/1985 | Smithers et al. |
| 4,512,387 A | 4/1985 | Rodriguez et al. |
| 4,529,887 A | 7/1985 | Johnson |
| 4,538,916 A | 9/1985 | Zimmerman |
| 4,562,360 A | 12/1985 | Fujimoto |
| 4,676,063 A | 6/1987 | Goebel et al. |
| 4,759,674 A | 7/1988 | Schroder et al. |
| 4,783,038 A | 11/1988 | Gilbert et al. |
| 4,793,386 A | 12/1988 | Sloan |
| 4,845,981 A | 7/1989 | Pearson |
| 4,898,473 A | 2/1990 | Stegemoeller et al. |
| 4,922,463 A | 5/1990 | Del Zotto et al. |
| 5,004,400 A | 4/1991 | Handke |
| 5,006,044 A | 4/1991 | Walker, Sr. et al. |
| 5,025,861 A | 6/1991 | Huber et al. |
| 5,050,673 A | 9/1991 | Baldridge |
| 5,114,239 A | 5/1992 | Allen |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley et al. |
| 5,230,366 A | 7/1993 | Marandi |
| 5,293,947 A | 3/1994 | Stratton |
| 5,334,899 A | 8/1994 | Skybyk |
| 5,366,324 A | 11/1994 | Arlt et al. |
| 5,422,550 A | 6/1995 | McClanahan et al. |
| 5,433,243 A | 7/1995 | Griswold et al. |
| 5,436,555 A | 7/1995 | Locke et al. |
| 5,439,066 A | 8/1995 | Gipson |
| 5,517,822 A | 5/1996 | Haws et al. |
| 5,548,093 A | 8/1996 | Sato et al. |
| 5,549,285 A | 8/1996 | Collins |
| 5,590,976 A | 1/1997 | Kilheffer et al. |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,791,636 A | 8/1998 | Loziuk |
| 5,798,596 A | 8/1998 | Lordo |
| 5,865,247 A | 2/1999 | Paterson et al. |
| 5,879,137 A | 3/1999 | Yie |
| 5,894,888 A | 4/1999 | Wiemers et al. |
| 5,907,970 A | 6/1999 | Havlovick et al. |
| 5,950,726 A | 9/1999 | Roberts |
| 6,035,265 A | 3/2000 | Dister et al. |
| 6,097,310 A | 8/2000 | Harrell et al. |
| 6,116,040 A | 9/2000 | Stark |
| 6,121,705 A | 9/2000 | Hoong |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira et al. |
| 6,208,098 B1 | 3/2001 | Kume et al. |
| 6,254,462 B1 | 7/2001 | Kelton et al. |
| 6,271,637 B1 | 8/2001 | Kushion |
| 6,273,193 B1 | 8/2001 | Hermann et al. |
| 6,315,523 B1 | 11/2001 | Mills |
| 6,406,011 B1 | 6/2002 | Kosar et al. |
| 6,477,852 B2 | 11/2002 | Dodo et al. |
| 6,484,490 B1 | 11/2002 | Olsen et al. |
| 6,491,098 B1 | 12/2002 | Dallas |
| 6,510,695 B1 | 1/2003 | Fisher |
| 6,529,135 B1 | 3/2003 | Bowers et al. |
| 6,626,646 B2 | 9/2003 | Rajewski |
| 6,633,727 B2 | 10/2003 | Henrie et al. |
| 6,719,900 B2 | 4/2004 | Hawkins |
| 6,765,304 B2 | 7/2004 | Baten et al. |
| 6,776,227 B2 | 8/2004 | Beida et al. |
| 6,788,022 B2 | 9/2004 | Sopko et al. |
| 6,802,690 B2 | 10/2004 | Han et al. |
| 6,808,303 B2 | 10/2004 | Fisher |
| 6,837,910 B1 | 1/2005 | Yoshikawa et al. |
| 6,931,310 B2 | 8/2005 | Shimizu et al. |
| 6,936,947 B1 | 8/2005 | Leijon et al. |

(56) References Cited

U.S. PATENT DOCUMENTS

| | | |
|---|---|---|
| 6,985,750 B1 | 1/2006 | Vicknair et al. |
| 7,082,993 B2 | 8/2006 | Ayoub et al. |
| 7,104,233 B2 | 9/2006 | Ryczek et al. |
| 7,170,262 B2 | 1/2007 | Pettigrew |
| 7,173,399 B2 | 2/2007 | Sihler et al. |
| 7,279,655 B2 | 10/2007 | Blutke et al. |
| 7,308,933 B1 | 12/2007 | Mayfield et al. |
| 7,309,835 B2 | 12/2007 | Morrison et al. |
| 7,312,593 B1 | 12/2007 | Streicher et al. |
| 7,336,514 B2 | 2/2008 | Amarillas et al. |
| 7,341,287 B2 | 3/2008 | Gibb et al. |
| 7,445,041 B2 | 11/2008 | O'Brien |
| 7,494,263 B2 | 2/2009 | Dykstra et al. |
| 7,500,642 B2 | 3/2009 | Cunningham et al. |
| 7,525,264 B2 | 4/2009 | Dodge |
| 7,563,076 B2 | 7/2009 | Brunet et al. |
| 7,581,379 B2 | 9/2009 | Yoshida et al. |
| 7,675,189 B2 | 3/2010 | Grenier |
| 7,683,499 B2 | 3/2010 | Saucier |
| 7,717,193 B2 | 5/2010 | Egilsson et al. |
| 7,755,310 B2 | 7/2010 | West et al. |
| 7,770,396 B2 | 8/2010 | Roby et al. |
| 7,795,830 B2 | 9/2010 | Johnson |
| 7,807,048 B2 | 10/2010 | Collette |
| 7,835,140 B2 | 11/2010 | Mori et al. |
| 7,845,413 B2 | 12/2010 | Shampine et al. |
| 7,900,893 B2 | 3/2011 | Teurlay et al. |
| 7,926,562 B2 | 4/2011 | Poitzsch et al. |
| 7,894,757 B2 | 7/2011 | Matsuno |
| 7,977,824 B2 | 7/2011 | Halen et al. |
| 8,037,936 B2 | 10/2011 | Neuroth et al. |
| 8,054,084 B2 | 11/2011 | Schulz et al. |
| 8,083,504 B2 | 12/2011 | Williams et al. |
| 8,091,928 B2 | 1/2012 | Carrier et al. |
| 8,096,354 B2 | 1/2012 | Poitzsch et al. |
| 8,096,891 B2 | 1/2012 | Lochtefeld et al. |
| 8,139,383 B2 | 3/2012 | Efraimsson et al. |
| 8,146,665 B2 | 4/2012 | Neal |
| 8,154,419 B2 | 4/2012 | Daussin et al. |
| 8,221,513 B2 | 7/2012 | Ariyapadi et al. |
| 8,232,892 B2 | 7/2012 | Overholt et al. |
| 8,261,528 B2 | 9/2012 | Chillar et al. |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria et al. |
| RE44,444 E | 8/2013 | Dole et al. |
| 8,506,267 B2 | 8/2013 | Gambier et al. |
| 8,534,235 B2 | 9/2013 | Chandler |
| 8,556,302 B2 | 10/2013 | Dole |
| 8,573,303 B2 | 11/2013 | Kerfoot |
| 8,596,056 B2 | 12/2013 | Woodmansee et al. |
| 8,616,005 B1 | 12/2013 | Cousino, Sr. |
| 8,616,274 B2 | 12/2013 | Belcher et al. |
| 8,646,521 B2 | 2/2014 | Bowen |
| 8,692,408 B2 | 4/2014 | Zhang et al. |
| 8,727,068 B2 | 5/2014 | Bruin |
| 8,760,657 B2 | 6/2014 | Pope et al. |
| 8,763,387 B2 | 7/2014 | Schmidt |
| 8,774,972 B2 | 7/2014 | Rusnak et al. |
| 8,789,601 B2 | 7/2014 | Broussard et al. |
| 8,795,525 B2 | 8/2014 | McGinnis et al. |
| 8,800,652 B2 | 8/2014 | Bartko et al. |
| 8,807,960 B2 | 8/2014 | Stephenson et al. |
| 8,838,341 B2 | 9/2014 | Kumano |
| 8,851,860 B1 | 10/2014 | Mail |
| 8,857,506 B2 | 10/2014 | Stone, Jr. et al. |
| 8,893,787 B2 | 11/2014 | Tips et al. |
| 8,899,940 B2 | 12/2014 | Laugemors et al. |
| 8,905,056 B2 | 12/2014 | Kendrick |
| 8,905,138 B2 | 12/2014 | Lundstedt et al. |
| 8,997,904 B2 | 4/2015 | Cryer et al. |
| 9,018,881 B2 | 4/2015 | Mao et al. |
| 9,051,822 B2 | 6/2015 | Ayan et al. |
| 9,051,923 B2 | 6/2015 | Kuo |
| 9,061,223 B2 | 6/2015 | Winborn |
| 9,062,545 B2 | 6/2015 | Roberts et al. |
| 9,067,182 B2 | 6/2015 | Nichols et al. |
| 9,103,193 B2 | 8/2015 | Coli et al. |
| 9,119,326 B2 | 8/2015 | McDonnell et al. |
| 9,121,257 B2 | 9/2015 | Coli et al. |
| 9,140,110 B2 | 9/2015 | Coli et al. |
| 9,160,168 B2 | 10/2015 | Chapel et al. |
| 9,175,554 B1 | 11/2015 | Watson |
| 9,206,684 B2 | 12/2015 | Parra et al. |
| 9,260,253 B2 | 2/2016 | Naizer |
| 9,322,239 B2 | 4/2016 | Angeles Boza et al. |
| 9,324,049 B2 | 4/2016 | Thomeer et al. |
| 9,340,353 B2 | 5/2016 | Oren |
| 9,366,114 B2 | 6/2016 | Coli et al. |
| 9,410,410 B2 | 8/2016 | Broussard et al. |
| 9,450,385 B2 | 9/2016 | Kristensen |
| 9,458,687 B2 | 10/2016 | Hallundbaek |
| 9,475,020 B2 | 10/2016 | Coli et al. |
| 9,475,021 B2 | 10/2016 | Coli et al. |
| 9,475,840 B2 | 10/2016 | Lledó et al. |
| 9,482,086 B2 | 11/2016 | Richardson et al. |
| 9,499,335 B2 | 11/2016 | McIver |
| 9,506,333 B2 | 11/2016 | Castillo et al. |
| 9,513,055 B1 | 12/2016 | Seal |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,706,185 B2 | 7/2017 | Ellis |
| 9,728,354 B2 | 8/2017 | Skolozdra et al. |
| 9,738,461 B2 | 8/2017 | DeGaray et al. |
| 9,739,546 B2 | 8/2017 | Bertilsson et al. |
| 9,745,840 B2 | 8/2017 | Oehring et al. |
| 9,840,901 B2 | 12/2017 | Oehring et al. |
| 9,863,228 B2 | 1/2018 | Shampine et al. |
| 9,893,500 B2 | 2/2018 | Oehring et al. |
| 9,903,190 B2 | 2/2018 | Conrad et al. |
| 9,909,398 B2 | 3/2018 | Pham |
| 9,915,128 B2 | 3/2018 | Hunter |
| 9,932,799 B2 | 4/2018 | Symchuk |
| 9,963,961 B2 | 5/2018 | Hardin et al. |
| 9,970,278 B2 | 5/2018 | Broussard et al. |
| 9,976,351 B2 | 5/2018 | Randall |
| 10,008,880 B2 | 6/2018 | Vicknair et al. |
| 10,020,711 B2 | 7/2018 | Oehring et al. |
| 10,119,381 B2 | 11/2018 | Oehring et al. |
| 10,184,465 B2 | 1/2019 | Enis et al. |
| 10,196,878 B2 | 2/2019 | Hunter |
| 10,221,639 B2 | 3/2019 | Romer et al. |
| 10,227,854 B2 | 3/2019 | Glass |
| 10,232,332 B2 | 3/2019 | Oehring et al. |
| 10,246,984 B2 | 4/2019 | Payne et al. |
| 10,254,732 B2 | 4/2019 | Oehring et al. |
| 10,260,327 B2 | 4/2019 | Kajaria et al. |
| 10,280,724 B2 | 5/2019 | Hinderliter |
| 10,287,873 B2 | 5/2019 | Filas et al. |
| 10,302,079 B2 | 5/2019 | Kendrick |
| 10,309,205 B2 | 6/2019 | Randall |
| 10,337,308 B2 | 7/2019 | Broussard et al. |
| 10,371,012 B2 | 8/2019 | Davis et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,030 B2 | 9/2019 | Oehring et al. |
| 10,408,031 B2 | 9/2019 | Oehring et al. |
| 10,415,332 B2 | 9/2019 | Morris et al. |
| 10,436,026 B2 | 10/2019 | Ounadjela et al. |
| 10,526,882 B2 | 1/2020 | Oehring et al. |
| 10,627,003 B2 | 4/2020 | Dale et al. |
| 10,648,311 B2 | 5/2020 | Oehring et al. |
| 10,669,471 B2 | 6/2020 | Schmidt et al. |
| 10,669,804 B2 | 6/2020 | Kotrla et al. |
| 10,690,131 B2 | 6/2020 | Rashid et al. |
| 10,695,950 B2 | 6/2020 | Igo et al. |
| 10,711,576 B2 | 7/2020 | Bishop |
| 10,740,730 B2 | 8/2020 | Altamirano et al. |

(56) References Cited

U.S. PATENT DOCUMENTS

| | | |
|---|---|---|
| 10,794,165 B2 | 10/2020 | Fischer et al. |
| 10,934,824 B2 | 3/2021 | Oehring et al. |
| 11,555,491 B2 * | 1/2023 | Oehring .................. H02P 27/04 |
| 11,815,082 B2 * | 11/2023 | Oehring ..................... H02J 3/38 |
| 2001/0000996 A1 | 5/2001 | Grimland et al. |
| 2002/0169523 A1 | 11/2002 | Ross et al. |
| 2003/0079875 A1 | 1/2003 | Weng |
| 2003/0056514 A1 | 3/2003 | Lohn |
| 2003/0057704 A1 | 3/2003 | Baten et al. |
| 2003/0138327 A1 | 7/2003 | Jones et al. |
| 2004/0040746 A1 | 3/2004 | Niedermayr et al. |
| 2004/0102109 A1 | 5/2004 | Cratty et al. |
| 2004/0167738 A1 | 8/2004 | Miller |
| 2004/0212679 A1 | 10/2004 | Jun |
| 2005/0061548 A1 | 3/2005 | Hooper et al. |
| 2005/0116541 A1 | 6/2005 | Seiver |
| 2005/0201197 A1 | 9/2005 | Duell et al. |
| 2005/0274508 A1 | 12/2005 | Folk et al. |
| 2006/0052903 A1 | 3/2006 | Bassett |
| 2006/0065319 A1 | 3/2006 | Csitari |
| 2006/0109141 A1 | 5/2006 | Huang et al. |
| 2006/0260331 A1 | 11/2006 | Andreychuk |
| 2007/0125544 A1 | 6/2007 | Robinson et al. |
| 2007/0131410 A1 | 6/2007 | Hill et al. |
| 2007/0187163 A1 | 8/2007 | Cone et al. |
| 2007/0201305 A1 | 8/2007 | Heilman et al. |
| 2007/0226089 A1 | 9/2007 | DeGaray et al. |
| 2007/0277982 A1 | 12/2007 | Shampine et al. |
| 2007/0278140 A1 | 12/2007 | Mallet et al. |
| 2008/0017369 A1 | 1/2008 | Sarada |
| 2008/0041596 A1 | 2/2008 | Blount et al. |
| 2008/0095644 A1 | 4/2008 | Mantei et al. |
| 2008/0112802 A1 | 5/2008 | Orlando et al. |
| 2008/0137266 A1 | 6/2008 | Jensen et al. |
| 2008/0142304 A1 | 6/2008 | Schutz et al. |
| 2008/0164023 A1 | 7/2008 | Dykstra et al. |
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1 | 10/2008 | Ochoa |
| 2008/0264640 A1 | 10/2008 | Eslinger |
| 2008/0264649 A1 | 10/2008 | Crawford |
| 2008/0277120 A1 | 11/2008 | Hickie |
| 2009/0045782 A1 | 2/2009 | Datta et al. |
| 2009/0065299 A1 | 3/2009 | Vito et al. |
| 2009/0068031 A1 | 3/2009 | Gambier et al. |
| 2009/0072645 A1 | 3/2009 | Quere |
| 2009/0078410 A1 | 3/2009 | Krenek et al. |
| 2009/0090504 A1 | 4/2009 | Weightman et al. |
| 2009/0093317 A1 | 4/2009 | Kajiwara et al. |
| 2009/0095482 A1 | 4/2009 | Surjaatmadja |
| 2009/0114392 A1 | 5/2009 | Tolman et al. |
| 2009/0145611 A1 | 6/2009 | Pallini, Jr. et al. |
| 2009/0153354 A1 | 6/2009 | Daussin et al. |
| 2009/0188181 A1 | 7/2009 | Forbis et al. |
| 2009/0200035 A1 | 8/2009 | Bjerkreim et al. |
| 2009/0200290 A1 | 8/2009 | Cardinal et al. |
| 2009/0260826 A1 | 10/2009 | Sherwood et al. |
| 2009/0308602 A1 | 12/2009 | Bruins et al. |
| 2009/0315297 A1 | 12/2009 | Nadeau et al. |
| 2010/0000508 A1 | 1/2010 | Chandler |
| 2010/0019574 A1 | 1/2010 | Baldassarre et al. |
| 2010/0038907 A1 | 2/2010 | Hunt et al. |
| 2010/0045109 A1 | 2/2010 | Arnold |
| 2010/0051272 A1 | 3/2010 | Loree et al. |
| 2010/0101785 A1 | 4/2010 | Khvoshchev et al. |
| 2010/0132949 A1 | 6/2010 | DeFosse et al. |
| 2010/0146981 A1 | 6/2010 | Motakef et al. |
| 2010/0172202 A1 | 7/2010 | Borgstadt |
| 2010/0193057 A1 | 8/2010 | Garner et al. |
| 2010/0200224 A1 | 8/2010 | Nguete et al. |
| 2010/0250139 A1 | 9/2010 | Hobbs et al. |
| 2010/0281876 A1 | 11/2010 | Khan et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0042387 A1 | 2/2011 | Henry et al. |
| 2011/0052433 A1 | 3/2011 | Huang |
| 2011/0061855 A1 | 3/2011 | Case et al. |
| 2011/0063942 A1 | 3/2011 | Hagan et al. |
| 2011/0081268 A1 | 4/2011 | Ochoa et al. |
| 2011/0085924 A1 | 4/2011 | Shampine et al. |
| 2011/0097988 A1 | 4/2011 | Lord |
| 2011/0110793 A1 | 5/2011 | Leugemores et al. |
| 2011/0166046 A1 | 7/2011 | Weaver et al. |
| 2011/0175397 A1 | 7/2011 | Amrine, Jr. et al. |
| 2011/0241590 A1 | 10/2011 | Horikoshi et al. |
| 2011/0247878 A1 | 10/2011 | Rasheed |
| 2011/0272158 A1 | 11/2011 | Neal |
| 2012/0018016 A1 | 1/2012 | Gibson et al. |
| 2012/0049625 A1 | 3/2012 | Hopwood |
| 2012/0063936 A1 | 3/2012 | Baxter et al. |
| 2012/0085541 A1 | 4/2012 | Love et al. |
| 2012/0111560 A1 | 5/2012 | Hill et al. |
| 2012/0112757 A1 | 5/2012 | Vrankovic et al. |
| 2012/0127635 A1 | 5/2012 | Grindeland |
| 2012/0150455 A1 | 6/2012 | Franklin et al. |
| 2012/0152716 A1 | 6/2012 | Kikukawa et al. |
| 2012/0205301 A1 | 8/2012 | McGuire et al. |
| 2012/0205400 A1 | 8/2012 | DeGaray et al. |
| 2012/0222865 A1 | 9/2012 | Larson et al. |
| 2012/0232728 A1 | 9/2012 | Karimi et al. |
| 2012/0247783 A1 | 10/2012 | Berner, Jr. et al. |
| 2012/0255734 A1 | 10/2012 | Coli et al. |
| 2013/0009469 A1 | 1/2013 | Gillett |
| 2013/0025706 A1 | 1/2013 | DeGaray et al. |
| 2013/0078114 A1 | 3/2013 | Van Rijswick et al. |
| 2013/0138254 A1 | 5/2013 | Seals et al. |
| 2013/0175038 A1 | 7/2013 | Conrad |
| 2013/0175039 A1 | 7/2013 | Guidry |
| 2013/0180722 A1 | 7/2013 | Caro et al. |
| 2013/0189629 A1 | 7/2013 | Chandler |
| 2013/0199617 A1 | 8/2013 | DeGaray et al. |
| 2013/0233542 A1 | 9/2013 | Shampine et al. |
| 2013/0255271 A1 | 10/2013 | Yu et al. |
| 2013/0284278 A1 | 10/2013 | Winborn |
| 2013/0284455 A1 | 10/2013 | Kajaria et al. |
| 2013/0299167 A1 | 11/2013 | Fordyce et al. |
| 2013/0306322 A1 | 11/2013 | Sanborn et al. |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0054965 A1 | 2/2014 | Jain |
| 2014/0060658 A1 | 3/2014 | Hains et al. |
| 2014/0077607 A1 | 3/2014 | Clarke et al. |
| 2014/0095114 A1 | 4/2014 | Thomeer et al. |
| 2014/0096974 A1 | 4/2014 | Coli et al. |
| 2014/0124162 A1 | 5/2014 | Leavitt |
| 2014/0138079 A1 * | 5/2014 | Broussard ............... H02P 23/00 166/66.4 |
| 2014/0158345 A1 | 6/2014 | Jang et al. |
| 2014/0174717 A1 * | 6/2014 | Broussard ............... E21B 43/26 166/66.4 |
| 2014/0219824 A1 | 8/2014 | Burnette |
| 2014/0238683 A1 | 8/2014 | Korach et al. |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0273128 A1 | 9/2014 | Coleman et al. |
| 2014/0277772 A1 | 9/2014 | Lopez et al. |
| 2014/0290768 A1 | 10/2014 | Randle et al. |
| 2014/0379300 A1 | 12/2014 | Devine et al. |
| 2015/0027712 A1 | 1/2015 | Vicknair et al. |
| 2015/0038021 A1 | 2/2015 | Gilliam |
| 2015/0053426 A1 | 2/2015 | Smith et al. |
| 2015/0068724 A1 | 3/2015 | Coli et al. |
| 2015/0068754 A1 | 3/2015 | Coli et al. |
| 2015/0075778 A1 | 3/2015 | Walters et al. |
| 2015/0083426 A1 | 3/2015 | Lesko |

(56) References Cited

U.S. PATENT DOCUMENTS

| | | |
|---|---|---|
| 2015/0097504 A1 | 4/2015 | Lamascus et al. |
| 2015/0114652 A1 | 4/2015 | Lestz et al. |
| 2015/0136043 A1 | 5/2015 | Shaaban et al. |
| 2015/0144336 A1 | 5/2015 | Hardin et al. |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman et al. |
| 2015/0211524 A1* | 7/2015 | Broussard .......... F04B 9/02 417/423.1 |
| 2015/0217672 A1 | 8/2015 | Shampine et al. |
| 2015/0225113 A1 | 8/2015 | Lungu et al. |
| 2015/0233520 A1 | 8/2015 | Fisher |
| 2015/0252661 A1 | 9/2015 | Glass |
| 2015/0300145 A1 | 10/2015 | Coli et al. |
| 2015/0300336 A1 | 10/2015 | Hernandez et al. |
| 2015/0314225 A1 | 11/2015 | Coli et al. |
| 2015/0330172 A1 | 11/2015 | Allmaras et al. |
| 2015/0354322 A1 | 12/2015 | Vicknair et al. |
| 2016/0006311 A1 | 1/2016 | Li |
| 2016/0032703 A1 | 2/2016 | Broussard et al. |
| 2016/0102537 A1 | 4/2016 | Lopez |
| 2016/0105022 A1 | 4/2016 | Oehring et al. |
| 2016/0208592 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris et al. |
| 2016/0186531 A1 | 6/2016 | Harkless et al. |
| 2016/0208593 A1 | 7/2016 | Coli et al. |
| 2016/0208594 A1 | 7/2016 | Coli et al. |
| 2016/0208595 A1 | 7/2016 | Tang et al. |
| 2016/0221220 A1 | 8/2016 | Paige |
| 2016/0230524 A1 | 8/2016 | Dumoit et al. |
| 2016/0230525 A1 | 8/2016 | Lestz et al. |
| 2016/0258267 A1 | 9/2016 | Payne et al. |
| 2016/0265457 A1 | 9/2016 | Stephenson et al. |
| 2016/0273328 A1* | 9/2016 | Oehring .......... F04B 23/04 |
| 2016/0273456 A1 | 9/2016 | Zhang |
| 2016/0281484 A1 | 9/2016 | Lestz et al. |
| 2016/0290114 A1 | 10/2016 | Oehring et al. |
| 2016/0290563 A1 | 10/2016 | Diggins |
| 2016/0312108 A1 | 10/2016 | Lestz et al. |
| 2016/0319649 A1 | 11/2016 | Oehring |
| 2016/0319650 A1 | 11/2016 | Oehring et al. |
| 2016/0326853 A1 | 11/2016 | Fredd et al. |
| 2016/0326854 A1 | 11/2016 | Broussard et al. |
| 2016/0326855 A1 | 11/2016 | Coli et al. |
| 2016/0341281 A1 | 11/2016 | Brunvold et al. |
| 2016/0348479 A1 | 12/2016 | Oehring et al. |
| 2016/0349728 A1 | 12/2016 | Oehring et al. |
| 2016/0369609 A1 | 12/2016 | Morris et al. |
| 2017/0016433 A1 | 1/2017 | Chong et al. |
| 2017/0021318 A1 | 1/2017 | McIver et al. |
| 2017/0022788 A1 | 1/2017 | Oehring et al. |
| 2017/0022807 A1 | 1/2017 | Dursun et al. |
| 2017/0028368 A1 | 2/2017 | Oehring et al. |
| 2017/0030178 A1 | 2/2017 | Oehring et al. |
| 2017/0036178 A1 | 2/2017 | Coli et al. |
| 2017/0036872 A1 | 2/2017 | Wallace et al. |
| 2017/0037717 A1 | 2/2017 | Oehring et al. |
| 2017/0037718 A1 | 2/2017 | Coli et al. |
| 2017/0043280 A1 | 2/2017 | Vankouwenberg |
| 2017/0051732 A1 | 2/2017 | Hemandez et al. |
| 2017/0074076 A1 | 3/2017 | Joseph et al. |
| 2017/0082033 A1 | 3/2017 | Wu et al. |
| 2017/0096885 A1 | 4/2017 | Oehring et al. |
| 2017/0096889 A1 | 4/2017 | Blanckaert et al. |
| 2017/0104389 A1 | 4/2017 | Morris et al. |
| 2017/0114625 A1 | 4/2017 | Norris et al. |
| 2017/0130743 A1 | 5/2017 | Anderson |
| 2017/0138171 A1 | 5/2017 | Richards et al. |
| 2017/0146189 A1 | 5/2017 | Herman et al. |
| 2017/0159570 A1 | 6/2017 | Bickert |
| 2017/0159654 A1 | 6/2017 | Kendrick |
| 2017/0175516 A1 | 6/2017 | Eslinger |
| 2017/0204852 A1 | 7/2017 | Barnett, Jr. |
| 2017/0212535 A1 | 7/2017 | Shelman et al. |
| 2017/0218727 A1 | 8/2017 | Oehring et al. |
| 2017/0218843 A1 | 8/2017 | Oehring et al. |
| 2017/0222409 A1 | 8/2017 | Oehring et al. |
| 2017/0226838 A1 | 8/2017 | Ciezobka et al. |
| 2017/0226842 A1 | 8/2017 | Omont et al. |
| 2017/0234250 A1 | 8/2017 | Janik et al. |
| 2017/0241221 A1 | 8/2017 | Seshadri et al. |
| 2017/0259227 A1 | 9/2017 | Morris et al. |
| 2017/0292513 A1 | 10/2017 | Haddad et al. |
| 2017/0313499 A1 | 11/2017 | Hughes et al. |
| 2017/0314380 A1 | 11/2017 | Oehring et al. |
| 2017/0314979 A1 | 11/2017 | Ye et al. |
| 2017/0328179 A1 | 11/2017 | Dykstra et al. |
| 2017/0369258 A1 | 12/2017 | DeGaray et al. |
| 2017/0370639 A1 | 12/2017 | Bardon et al. |
| 2018/0028992 A1 | 2/2018 | Stegemoeller et al. |
| 2018/0038216 A1 | 2/2018 | Zhang et al. |
| 2018/0045331 A1 | 2/2018 | Lopez et al. |
| 2018/0090914 A1 | 3/2018 | Johnson et al. |
| 2018/0181830 A1 | 6/2018 | Luharuka et al. |
| 2018/0216455 A1 | 8/2018 | Andreychuk et al. |
| 2018/0238147 A1 | 8/2018 | Shahri et al. |
| 2018/0245428 A1 | 8/2018 | Richards |
| 2018/0259080 A1 | 9/2018 | Dale et al. |
| 2018/0266217 A1 | 9/2018 | Funkhauser et al. |
| 2018/0266412 A1 | 9/2018 | Stokkevag et al. |
| 2018/0284817 A1 | 10/2018 | Cook et al. |
| 2018/0291713 A1 | 10/2018 | Jeanson |
| 2018/0298731 A1 | 10/2018 | Bishop |
| 2018/0312738 A1 | 11/2018 | Rutsch et al. |
| 2018/0313677 A1 | 11/2018 | Warren et al. |
| 2018/0320483 A1 | 11/2018 | Zhang et al. |
| 2018/0343125 A1 | 11/2018 | Clish et al. |
| 2018/0363640 A1 | 12/2018 | Kajita et al. |
| 2019/0003329 A1 | 1/2019 | Morris et al. |
| 2019/0010793 A1 | 1/2019 | Hinderliter |
| 2019/0011066 A1 | 1/2019 | Ungchusri et al. |
| 2019/0040727 A1 | 2/2019 | Oehring et al. |
| 2019/0063309 A1 | 2/2019 | Davis |
| 2019/0100989 A1 | 4/2019 | Stewart et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0128080 A1 | 5/2019 | Ross et al. |
| 2019/0128104 A1 | 5/2019 | Graham et al. |
| 2019/0145251 A1 | 5/2019 | Johnson |
| 2019/0154020 A1 | 5/2019 | Glass |
| 2019/0162061 A1 | 5/2019 | Stephenson |
| 2019/0169971 A1 | 6/2019 | Oehring et al. |
| 2019/0178057 A1 | 6/2019 | Hunter |
| 2019/0178235 A1 | 6/2019 | Coskrey et al. |
| 2019/0203567 A1 | 7/2019 | Ross et al. |
| 2019/0203572 A1 | 7/2019 | Morris et al. |
| 2019/0211661 A1 | 7/2019 | Reckels et al. |
| 2019/0245348 A1 | 8/2019 | Hinderliter et al. |
| 2019/0249527 A1 | 8/2019 | Kraynek |
| 2019/0257462 A1 | 8/2019 | Rogers |
| 2019/0292866 A1 | 9/2019 | Ross et al. |
| 2019/0292891 A1 | 9/2019 | Kajaria et al. |
| 2019/0226317 A1 | 10/2019 | Payne et al. |
| 2020/0047141 A1 | 2/2020 | Oehring et al. |
| 2020/0088152 A1 | 3/2020 | Allion et al. |
| 2020/0232454 A1 | 7/2020 | Chretien et al. |

FOREIGN PATENT DOCUMENTS

| | | |
|---|---|---|
| CA | 2482943 A1 | 10/2003 |
| CA | 2707269 A1 | 12/2010 |
| CA | 2797081 A1 | 11/2011 |
| CA | 3050131 A1 | 11/2011 |
| CA | 2955706 A1 | 10/2012 |
| CA | 2966672 A | 10/2012 |
| CA | 2849825 A1 | 4/2013 |
| CA | 3000322 A1 | 4/2013 |
| CA | 2787814 A1 | 2/2014 |
| CA | 2833711 A1 | 5/2014 |

(56) References Cited

FOREIGN PATENT DOCUMENTS

| | | |
|---|---|---|
| CA | 2919649 A1 | 8/2016 |
| CA | 2919666 A1 | 8/2016 |
| CA | 2978706 A1 | 9/2016 |
| CA | 2944980 A1 | 4/2017 |
| CA | 2945579 A1 | 4/2017 |
| CA | 3006422 A1 | 6/2017 |
| CA | 3018485 A1 | 8/2017 |
| CA | 2964593 A1 | 10/2017 |
| CA | 3067854 A1 | 1/2019 |
| CN | 201687513 U | 12/2010 |
| CN | 101977016 A | 2/2011 |
| CN | 202023547 U | 11/2011 |
| CN | 102602322 A | 7/2012 |
| CN | 104117308 A | 10/2014 |
| CN | 104196613 A | 12/2014 |
| CN | 205986303 U | 2/2017 |
| CN | 108049999 A | 5/2018 |
| CN | 112196508 A | 1/2021 |
| JP | 2004264589 A | 9/2004 |
| WO | 0047893 A1 | 8/2000 |
| WO | 2007055587 A1 | 5/2007 |
| WO | 2012051705 A1 | 4/2012 |
| WO | 2014105642 A1 | 7/2014 |
| WO | 2014116761 A1 | 7/2014 |
| WO | 2014177346 A1 | 11/2014 |
| WO | 2016144939 A1 | 9/2016 |
| WO | 2016160458 A1 | 10/2016 |
| WO | 2018044307 A1 | 3/2018 |
| WO | 2018213925 A1 | 11/2018 |

OTHER PUBLICATIONS

Non-Final Office Action issued in corresponding U.S. Appl. No. 16/443,273, dated Oct. 5, 2020.
Non-Final Office Action issued in corresponding U.S. Appl. No. 16/943,727, dated Sep. 29, 2020.
Non-Final Office Action issued in corresponding U.S. Appl. No. 16/356,263, dated Sep. 2, 2020.
Non-Final Office Action issued in corresponding U.S. Appl. No. 16/167,083, dated Aug. 31, 2020.
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action issued in Canadian Application No. 2,982,974, dated Sep. 22, 2020.
International Search Report and Written Opinion issued in PCT Application No. PCT/US2020/036932, dated Sep. 3, 2020.
"Process Burner", (https://www.cebasrt.com/productsloii-gaslprocess-burner), 06 Sep. 6, 2018 (Sep. 6, 2018), entire document, especially para (Burners for refinery Heaters].
"Water and Glycol Heating Systems", (https://www.heat-inc.com/wg-series-water-glycol-systems/), Jun. 18, 2018 (Jun. 18, 2018), entire document, especially WG Series Water Glycol Systems.
"Heat Exchanger", (https://en.wikipedia.org/w/index.php?title=Heat_exchanger&oldid=89300146), Dec. 18, 2019 Apr. 2019 (Apr. 18, 2019), entire document, especially para (0001].
Canadian Office Action issued in Canadian Application No. 2,928,707, dated Sep. 8, 2020.
Canadian Office Action issued in Canadian Application No. 2,944,980, dated Aug. 31, 2020.
International Search Report and Written Opinion issued in PCT Application No. PCT/US2020/023821, dated Aug. 28, 2020.
Non-Final Office Action issued in corresponding U.S. Appl. No. 16/871,928, dated Aug. 25, 2021.
Non-Final Office Action issued in corresponding U.S. Appl. No. 16/943,727, dated Aug. 3, 2021.
Non-Final Office Action issued in corresponding U.S. Appl. No. 14/881,525, dated Jul. 21, 2021.
Non-Final Office Action issued in corresponding U.S. Appl. No. 16/404,283, dated Jul. 21, 2021.
Notice of Allowance issued in corresponding U.S. Appl. No. 15/829,419, dated Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.
International Search Report and Written Opinion issued in PCT Application No. PCT/US2020/067526, dated May 6, 2021.
International Search Report and Written Opinion issued in PCT Application No. PCT/US2020/067608, dated Mar. 30, 2021.
International Search Report and Written Opinion issued in PCT Application No. PCT/US2020/067528, dated Mar. 19, 2021.
International Search Report and Written Opinion issued in PCT Application No. PCT/US2020/067146, dated Mar. 29, 2021.
International Search Report and Written Opinion issued in PCT Application No. PCT/US2020/067523, dated Mar. 22, 2021.
International Search Report and Written Opinion issued in PCT Application No. PCT/US2020/066543, dated May 11, 2021.
Morris et al., U.S. Appl. No. 62/526,869; Hydration-Blender Transport and Electric Power Distribution for Fracturing Operation; Jun. 28, 2018; USPTO; see entire document.
Final Office Action issued in corresponding U.S. Appl. No. 16/597,014, dated Feb. 4, 2021.
International Search Report and Written Opinion issued in PCT Application No. PCT/US2020/059834, dated Feb. 4, 2021.
International Search Report and Written Opinion issued in PCT Application No. PCT/US2020/058906, dated Feb. 2, 2021.
International Search Report and Written Opinion issued in PCT Application No. PCT/US2020/058899, dated Feb. 3, 2021.
Non-Final Office Action issued in corresponding Application No. 16/564,185, dated Jan. 29, 2021.
Final Office Action issued in corresponding U.S. Appl. No. 16/458,696, dated Jan. 21, 2021.
Final Office Action issued in corresponding U.S. Appl. No. 16/404,283, dated Jan. 11, 2021.
Non-Final Office Action issued in corresponding U.S. Appl. No. 16/522,043, dated Jan. 4, 2021.
International Search Report and Written Opinion issued in PCT Application No. PCT/US2020/053980, dated Dec. 14, 2020.
Hampton, "Low-cost fracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 pages.
Abbott et al., "Crippling the Innovation Economy: Regulatory Overreach at the Patent Office," Regulatory Transparency Project of the Federalist Society, Aug. 14, 2017, 35 pages.
"All Electric Fracturing—Reducing Emissions and Cost," 2021, H013770, 6 pages.
"Hydraulic Fracturing Techbook," Hart Energy, 2015, 9 pages.
"Petroleum Alumnus and Team Development Mobile Fracturing Unit that Alleviates Environmental Impact," LSU College of Engineering, 2021, 2 pages.
"Clean Fleet Reduces Emissions by 99% at Hydraulic Fracturing Sites," FluidPower Journal, 2019, 5 pages.
Deutser, "Game-changing hydraulic fracturing technology, reduces emissions by 99%," Intrado GlobeNewswire, Oct. 1, 2014, 4 pages.
"Halliburton Delivers Successful Grid-Powered Frac Operation", Halliburton News Release, Jan. 14, 2021, 4 pages.
Wang et al., "Development In The Limited—Entry Completion Fracturing Technique," SPE 17834, 1988, 13 pages.
Milligan, "Sour Gas Well Completion Practices in the Foothills," Society of Petroleum Engineers of AIME, Sep. 1982, 12 pages.
Holden III et al., "Successful Stimulation of Fordoche Field With a Retarded HF Acid," Society of Petroleum Engineers of AIME, Aug. 1981, 6 pages.
Beck et al., "Reservoir Evaluation Of Fractured Cretaceous Carbonates In South Texas," SPWLA Eighteenth Annual Logging Symposium, Jun. 5-8, 1977, 25 pages.
Webster, "Current Completion Practices in Tight Reservoirs," Society of Petroleum Engineers, SPE 6379, 1977, 8 pages.
Bielstein, "Wire-Line Methods and Equipment," Humble Oil and Refining Company, Apr. 2, 1967, 16 pages.
UK Power Networks—Transformers to Supply Heat to Tate Modern—from Press Releases May 16, 2013.

(56) References Cited

OTHER PUBLICATIONS

Non-Final Office Action issued in corresponding U.S. Appl. No. 15/293,681, dated Feb. 16, 2017.
Non-Final Office Action issued in corresponding U.S. Appl. No. 15/294,349, dated Mar. 14, 2017.
Final Office Action issued in corresponding U.S. Appl. No. 15/145,491, dated Jan. 20, 2017.
Non-Final Office Action issued in corresponding U.S. Appl. No. 15/145,443, dated Feb. 7, 2017.
Notice of Allowance issued in corresponding U.S. Appl. No. 15/217,040, dated Mar. 28, 2017.
Notice of Allowance issued in corresponding U.S. Appl. No. 14/622,532, dated Mar. 27, 2017.
Non-Final Office Action issued in corresponding U.S. Appl. No. 15/291,842, dated Jan. 6, 2017.
Final Office Action issued in corresponding U.S. Appl. No. 14/622,532, dated Dec. 7, 2016.
Non-Final Office Action issued in corresponding U.S. Appl. No. 14/622,532, dated May 17, 2016.
Final Office Action issued in corresponding U.S. Appl. No. 14/622,532, dated Dec. 21, 2015.
Non-Final Office Action issued in corresponding U.S. Appl. No. 14/622,532, dated Aug. 5, 2015.
Non-Final Office Action issued in corresponding U.S. Appl. No. 15/145,491, dated Sep. 12, 2016.
Non-Final Office Action issued in corresponding U.S. Appl. No. 15/217,040, dated Nov. 29, 2016.
Non-Final Office Action issued in corresponding U.S. Appl. No. 15/235,788, dated Dec. 14, 2016.
Non-Final Office Action issued in corresponding U.S. Appl. No. 15/145,491, dated May 15, 2017.
Notice of Allowance issued in corresponding U.S. Appl. No. 15/293,681, dated Aug. 9, 2017.
Notice of Allowance issued in corresponding U.S. Appl. No. 15/293,681, dated Oct. 4, 2017.
Final Office Action issued in corresponding U.S. Appl. No. 15/294,349, dated Jul. 6, 2017.
Non-Final Office Action issued in corresponding U.S. Appl. No. 15/294,349, dated Apr. 10, 2018.
Restriction Requirement issued in corresponding U.S. Appl. No. 15/294,349, dated Dec. 20, 2016.
Notice of Allowance issued in corresponding U.S. Appl. No. 15/294,349, dated Nov. 20, 2018.
Notice of Allowance issued in corresponding U.S. Appl. No. 15/294,349, dated Dec. 26, 2018.
Notice of Allowance issued in corresponding U.S. Appl. No. 15/294,349, dated Jan. 30, 2019.
Final Office Action issued in corresponding U.S. Appl. No. 15/145,491, dated Sep. 6, 2017.
Notice of Allowance issued in corresponding U.S. Appl. No. 15/145,491, dated Apr. 9, 2018.
Notice of Allowance issued in corresponding U.S. Appl. No. 15/145,491, dated Jun. 14, 2018.
Restriction Requirement issued in corresponding U.S. Appl. No. 15/145,443, dated Nov. 1, 2016.
Final Office Action issued in corresponding U.S. Appl. No. 15/145,443, dated May 26, 2017.
Non-Final Office Action issued in corresponding U.S. Appl. No. 15/145,443, dated Feb. 1, 2018.
Final Office Action issued in corresponding U.S. Appl. No. 15/145,443, dated Sep. 14, 2018.
Non-Final Office Action issued in corresponding U.S. Appl. No. 15/145,443, dated Mar. 14, 2019.
Final Office Action issued in corresponding U.S. Appl. No. 15/145,443, dated Oct. 15, 2019.
Non-Final Office Action issued in corresponding U.S. Appl. No. 15/145,443, dated May 8, 2020.
Final Office Action issued in corresponding U.S. Appl. No. 15/145,443, dated Feb. 8, 2021.
Non-Final Office Action issued in corresponding U.S. Appl. No. 15/145,443, dated Sep. 20, 2021.
Final Office Action issued in corresponding U.S. Appl. No. 15/145,443, dated Apr. 8, 2022.
Non-Final Office Action issued in corresponding U.S. Appl. No. 15/145,443, dated Oct. 24, 2022.
Final Office Action issued in corresponding U.S. Appl. No. 15/145,443, dated May 22, 2023.
Notice of Allowance issued in corresponding U.S. Appl. No. 15/145,443, dated Dec. 18, 2023.
Notice of Allowance issued in corresponding U.S. Appl. No. 15/291,842, dated May 9, 2017.
Notice of Allowance issued in corresponding U.S. Appl. No. 15/291,842, dated Jun. 7, 2017.
Final Office Action issued in corresponding U.S. Appl. No. 15/235,788, dated May 3, 2017.
Non-Final Office Action issued in corresponding U.S. Appl. No. 15/235,788, dated Oct. 27, 2017.
Final Office Action issued in corresponding U.S. Appl. No. 15/235,788, dated Apr. 27, 2018.
Non-Final Office Action issued in corresponding U.S. Appl. No. 15/235,788, dated Nov. 6, 2020.
Final Office Action issued in corresponding U.S. Appl. No. 15/235,788, dated May 14, 2021.
Notice of Allowance issued in corresponding U.S. Appl. No. 15/235,788, dated Dec. 10, 2021.
Notice of Allowance issued in corresponding U.S. Appl. No. 15/235,788, dated Mar. 25, 2022.
Notice of Allowance issued in corresponding U.S. Appl. No. 15/235,788, dated May 11, 2022.
"AGS Flexible Coupling Style W77," Victaulic, Apr. 23, 2015, available at: https://web.archive.org/web/20150423052817/http://www.victaulic.com/en/products-services/products/style-w77-ags-flexible-coupling/, 1 page.
"Advanced Groove System (AGS) Large Diameter Solutions." Victaulic, Apr. 19, 2015, available at: https://web.archive.org/web/20150419063052/http:/www.victaulic.com/en/businesses-solutions/solutions/advanced-groove-system/, 2 pages.
"Accommodating Seismic Movement," Victaulic, Apr. 12, 2015, available at https://web.archive.org/web/20150412042941/http:/www.victaulic.com/en/businesses-solutions/solutions/accommodating-seismic-movement/, 2 pages.
Saville, "The Victaulic Pipe Joint," Journal (American Water Works Association), Nov. 1922, vol. 9, No. 6, 8 pages.
Balaji et al., "Wire rope isolators for vibration isolation of equipment and structures," IP Conference Series: Materials Science and Engineering, 2015, 12 pages.
"FlowGuard Products," CoorsTek, Sep. 15, 2014 available at: https://web.archive.org/web/20140915230538/http://coorstek.com/resource-library/library/8510-1747-FlowGuard-Pulsation-Dampers.pdf, 8 pages.
"FlowGuard Pulsation Dampeners," CoorsTek, Feb. 23, 2015, available at: https://web.archive.org/web/20150223101630/http://www.coorstek.com/markets/energy_equipment/oil-gas/flowguard.php, 2 pages.
Morton, "Unlocking the Earth: A Short History of Hydraulic Fracturing," GEO ExPro, vol. 10, No. 6, Dec. 2013, 5 pages.
"Welcome to Stauff," Stauff, Aug. 5, 2013, 1 page.
"Stauff Clamps," Stauff, Aug. 7, 2013, 3 pages.
"Stauff Clamps, Heavy Series (DIN 3015-2)," Stauff, Aug. 30, 2013, 1 page.
"Heavy Series (DIN 3015-2)", Stauff, Product Literature, Nov. 3, 2013, 1 page.
"Heavy Series DIN 3015, Part 2," Stauff, Nov. 5, 2013, 24 pages.
Harris et al., "Harris' Shock and Vibration Handbook—Fifth Edition," McGraw-Hill Handbooks, 2002 [excerpted], 22 pages.
"Mark's Standard Handbook for Mechanical Engineers, 11th Edition," McGraw-Hill, ISBN 0-07-142867-4, 2007 [excerpted], 1 page.
Mallik et al., "On the Modelling of Non-Linear Elastomeric Vibration Isolators," Journal of Sound and Vibration, 1999, 16 219(2), 15 pages.

(56) References Cited

OTHER PUBLICATIONS

17 Malcius, "Mathematical model evaluation and parameter identification of pipe holder element," Journal of Vibroengineering, Jun. 2013, vol. 15, Issue 2, ISSN 1392-8716, 9 pages.
Wachel, "Piping Vibration Analysis," Engineering Dynamics, Incorporated, Proceedings of the Nineteenth 18 Turbomachinery Symposium, 1990, 16 pages.
"Manufacturers of Cushioned Clamping, Quick Coupling & Support Systems," ZSI Beta Clamps, ZSI, Inc., Apr. 29, 2015, 2 pages.
Meikrantz et al., "Advances in Liquid/Liquid Centrifuge Design Provide New Options for Petroleum Production," Society of Petroleum Engineers, SPE 56709, 1999, 4 pages.
Arvani et al., "Design and Development of an Engineering Drilling Simulator and Application for Offshore Drilling for 21 MODUs and Deepwater Environments," Society of Petroleum Engineers, SPE-170301-MS, 2014, 17 pages.
Davis, "Natural Gas Finding Niche in E-Fracking, But Diesel Still Rules," Natural Gas Intelligence, NGI, 2019, 9 pages.
Shafto, "Growth in electric-fracking fleets stunted by tight producer budgets," S&P Global Market Intelligence, Aug. 6, 2019, 4 pages.
"Swivel Joint," Jereh, Yantal Jereh Petroleum Equipment & Technologies Co. Ltd., printed Dec. 1, 2022, 14 pages.
Camara, "Electrical Engineering Reference Manual for the Electrical and Computer PE Exam—Sixth Edition," Professional Publications, Inc., ISBN: 1-888577-56-8, 2002, 50 pages.
"Comprehensive Power, Power It Up," Technical Presentation, Feb. 27, 2013 (available at: https://www.slideshare.net/jeffsable/comprehensive-power-introduction-oct2013?from_action=save), 28 pages.
"Comprehensive Power, Power It Up," Technical Presentation, Oct. 3, 2013 (available at: https://www.slideshare.net/jeffsable/comprehensive-power-introduction-oct2013?from_action=save), 26 pages.
"American National Standard—Motors and Generators," ANSI/NEMA MG 1, 2011, 636 pages (submitted in 4 parts).
"IEEE Standard for Petroleum and Chemical Industry—Premium-Efficiency, Severe-Duty, Totally Enclosed Fan-Cooled (TEFC) Squirrel Cage Induction Motors—Up to and Including 370 kW (500 hp)," IEEE, 2009, 32 pages.
"Reinventing the Frac Fleet," Clean Fleet, WhisperFrac Reducing Noise and Vibrations, 2018, 2 pages.
"MEC's Mobile Electric Centers for Voltages up to 36kV," ABB, printed 2021, 2 pages.
"Prefabricated Electric Centers (PEC) Mobile Electric Centers (MEC)," ABB, 2017, 14 pages.
"Mobile Substations on wheels," ABB, 2022, 4 pages.
"Benefits of Using Mobile Transformers and Mobile Substations for Rapidly Restoring Electrical Service," U.S. Department of Energy, Aug. 2006, 48 pages.
"The Evolution of the Modern Substation," Primera, 2022, 4 pages.
Hanna et al., "Medium-Voltage Adjustable-Speed Drives—Users' and Manufacturers' Experiences," IEEE Transactions on Industry Applications, vol. 33, No. 6, Nov./Dec. 1997, 9 pages.
"IEEE 100: The Authoritative Dictionary of IEEE Standards Terms, Seventh Edition," IEEE Press, 2000, ISBN: 0-7381-2601-2, 7 pages.
"Adjustable Speed Electrical Power Drive Systems—Part 4: General Requirements—Rating Specifications for A.C. Power Drive Systems Above 1000 V A.C. and Not Exceeding 35 KV," National Electrical Manufacturers Association (NEMA) Standards Publication ICS 61800-4, 2004, 139 pages.
Roe, "Practices and Procedures of Industrial Electrical Design," McGraw-Hill, 1972, ISBN: 0-07-053390-3, 17 pages.
"TM2500+ Mobile Gas Turbine Generator 50/60 Hz Applications fact sheet," GE Power & Water Distributed Power, Jul. 15, 2014, 2 pages.
Oehring et al., Provisional U.S. Appl. No. 62/242,173, 2015, 17 pages.
Samsung All-In-One Security System, Quick Start Guide Kit Model SDHC5100, printed 2022, 11 pages.
Amazon.com listing for Samsung SDH-C5100 16 Channel 720p HD DVR Video Security System, 2015, 2 pages.
Amazon.com listing for Amcrest ProHD Wireless IP Security Camera, 2015, 8 pages.
Amazon.com listing for Security & Surveillance Cameras, 2015, 6 pages.
Stewart, "Extracting the Digit!! Time for an ROV Electronics Shake-Up?," Kongsberg Simrad Ltd, UTI, 1997, 10 pages.
Martin et al., "Lessons Learned from 27 Years' Experience of Stimulation Vessel Design and Operation—a Case Study," SPE 166243, 2013, 12 pages.
Maddox, "Visualizing Production in Flowing Oil Wells," Halliburton Energy Services, SPWLA 37th Annual Logging Symposium, Jun. 16-19, 1996, 6 pages.
Cooper et al., "The First Purpose-Built Stimulation Vessel for North Sea Application," Dowell Schlumberger, Society of Petroleum Engineers of AIME, SPE 12993, 1984, 7 pages.
Talley, "Development of a Closed Circuit TV Borehole Probe," Design Engineering Laboratories, Inc., Contract H0308041, Sep. 1984, 22 pages.
"Form-wound Squirrel-Cage Induction Motors—500 Horsepower and Larger," ANSI/API Standard, 541-2003, Fourth Edition, Jun. 2004, 88 pages.
Gardner Denver, "Well Servicing Pump, Model GD-2500Q, Quintuplex, Operating and Service Manual," 300FWF996 Revision C, Aug. 2005, 46 pages.
"Standard Specification for Steel Bars, Carbon and Alloy, Hot-Wrought, General Requirements for," ASTM Int;I, A 29/A 29M—05, 2005, 16 pages.
"Variable Speed Pumping: A Guide to Successful Applications," Elsevier 2004, ISBN 1-85617-449-2, 2004, 186 pages.
Bonnett et al., "Squirrel Cage Rotor Options for A.C. Induction Motors," IEEE, 2000, 14 pages.
Bonnett, "Root Cause Failure Analysis for AC Induction Motors in the Petroleum and Chemical Industry," IEEE, Paper No. PCIC-2010-43, 2010, 13 pages.
"Mark's Standard Handbook for Mechanical Engineers, 11th Edition," McGraw-Hill, ISBN 0-07-142867-4, 2006, 11 pages.
"Standard Handbook for Electrical Engineers," Thirteenth Edition, McGraw-Hill, ISBN 0-07-020984-7, 1993, 9 pages (Part 1).
"Standard Handbook for Electrical Engineers," Thirteenth Edition, McGraw-Hill, ISBN 0-07-020984-7, 1993, 7 pages (Part 2).
"Standard Handbook for Electrical Engineers," Thirteenth Edition, McGraw-Hill, ISBN 0-07-020984-7, 1993, 6 pages (Part 3).
"112 IEEE Standard Test Procedure for Polyphase Induction Motors and Generators," IEEE Power Engineering Society, IEEE Std 112, 2004, 42 pages (Part 1).
"112 IEEE Standard Test Procedure for Polyphase Induction Motors and Generators," IEEE Power Engineering Society, IEEE Std 112, 2004, 45 pages (Part 2).
Hodowanec et al., "Introduction to API Standard 541, 4th Edition—Form-Wound Squirrel Cage Induction Motors—Larger than 500 Horsepower," IEEE, Paper No. PCIC-2003-33, 2003, 9 pages.
Rahill et al., "Sorting Out the Overlap," IEEE Industry Applications Magazine, vol. 15, No. 1, Jan.-Feb. 2009, 12 pages.
Cary et al., "Electric Rotating Machine Standards Part II: Magnetic Wedge Design & Monitoring Methods," IEEE, Paper No. PCIC-2011-41, 2011, 8 pages.
Bogh et al., "A User's Guide to Factory Testing of Large Motors: What Should Your Witness Expect?," IEEE, Paper No. PCIC-, 2009, 8 pages.
Lockley et al., "What Do the API Motor/Generator Features Cost and What Do They Buy You?," IEEE, Paper No. PCIC-2010-22, 2010, 10 pages.
Malinowski et al., "Petrochemical standards a comparison between IEEE 841-2001, API 541 and API 547," IEEE, Paper No. PCIC-2004-22, 2004, 8 pages.
Mistry et al., "Induction Motor Vibrations in View of the API 541-4th edition," IEEE, Paper No. PCIC-, 2008, 10 pages.
Paschall et al., "Navigating the Test Requirements of API 541 4th Edition," IEEE, Paper No. PCIC-2007-11, 2007, 12 pages.
"G7 Adjustable Speed Drive Operation Manual," Toshiba, Document No. 51546-009, Mar. 2005, 221 pages.

(56) References Cited

OTHER PUBLICATIONS

"Weir SPM: General Catalog," Weir SPM, 2009, 40 pages.
Krueger, "Advances in Well Completion and Stimulation During JPT's First Quarter Century," Journal of Petroleum Technology, Dec. 1973, pp. 16.
Lietard et al., "Hydraulic Fracturing of Horizontal Wells: An Update of Design and Execution Guidelines," Society of Petroleum Engineers, SPE 37122, 1996, 15 pages.
Waters et al., "Simultaneous Hydraulic Fracturing of Adjacent Horizontal Wells in the Woodford Shale," Society of Petroleum Engineers, SPE 119635, 2009, 22 pages.
Bahadori et al., "Dictionary of Oil, Gas, and Petrochemical Processing," CRC Press, ISBN: 978-1-4665-8825-7, 2014, 8 pages.
"A Dictionary for the Oil and Gas Company—Second Edition," The University of Texas at Austin—Petroleum Extension Service, ISBN: 978-0-88698-240-9, 2011, 7 pages.
"Lessons Learned from Natural Gas Star Partners: Reduced Emissions Completions for Hydraulically Fractured Natural Gas Wells," U.S. Environmental Protection Agency, 2011, 12 pages.
Kidnay et al., "Fundamentals of Natural Gas Processing—Second Edition," CRS Press, ISBN: 978-1-4200-8519-8, 2011, 19 pages (Part 1).
Kidnay et al., "Fundamentals of Natural Gas Processing—Second Edition," CRS Press, ISBN: 978-1-4200-8519-8, 2011, 17 pages (Part 2).
Kidnay et al., "Fundamentals of Natural Gas Processing—Second Edition," CRS Press, ISBN: 978-1-4200-8519-8, 2011, 12 pages (Part 3).
Listing at Amazon.com for Kidnay et al., "Fundamentals of Natural Gas Processing—Second Edition," CRS Press, ISBN: 978-1-4200-8519-8, Jul. 7, 2013, 4 pages.
Listing at Amazon.com for Kidnay et al., "Fundamentals of Natural Gas Processing—Second Edition," CRS Press, ISBN: 978-1-4200-8519-8, Feb. 22, 2015, 4 pages.
"Green Completions," IPIECA, Jan. 20, 2015, 7 pages.
"Sand Trap FAQ," Mountain Equipment of New Mexico, Inc., Jan. 8, 2014, 2 pages.
"Test Separators FAQ," Mountain Equipment of New Mexico, Inc., Jan. 8, 2014, 2 pages.
"Emergency Power Systems for Critical Facilities: A Best Practices Approach to Improving Reliability," FEMA, FEMA P-1019. Sep. 2014, 170 pages.
Persily et al., "Indoor Environmental Issues in Disaster Resilience," NIST Technical Note 1882, Jul. 2015, 40 pages.
"Precision Heat and Control Systems for Onshore Drilling and Production," Chromalox Precision Heat and Control, 2011, 6 pages.
"Zeus Electric Pumping Unit," Halliburton, printed 2021, 4 pages.
Nayyar, "Piping Handbook—Seventh Edition," Piping Handbook, 1999, 77 pages.
"Wire Rope Isolator Technologies," ITT Enidine, Inc., Mar. 29, 2014, Enidine, 78 pages.
Gardner Denver, Well Servicing Pump, Model GD-2500Q, GD-2500Q-HD, Quintuplex Pumps, Super GWS Fluid End (Uni-Flange) Parts List, 310FWF997 Revision A, Sep. 2011, 45 pages.
Wachel et al., "Analysis of Vibration and Failure Problems in Reciprocating Triplex Pumps for Oil Pipelines," The American Society of Mechanical Engineers, 1985, 8 pages.
"Flowline Products and Services—World Proven Chiksan and Weco Equipment," FMC Technologies, Mar. 28, 2015, 31 pages (Part 1).
"Flowline Products and Services—World Proven Chiksan and Weco Equipment," FMC Technologies, Mar. 28, 2015, 49 pages (Part 2).
"A complete line of swivel joints for drilling, production, and well servicing," Chiksan Original Swivel Joints, Nov. 1996, 16 pages.
"Worlds Best Swivel Joints," FlowValve, Jan. 17, 2015, available at https://web.archive.org/web/20150117041757/http://www.flowvalve.com/swivels, 10 pages.
"Victualic Couplings—Vibration Attenuation Characteristics," Victaulic Company, Oct. 2014, 5 pages.
Hudson et al., "Modeling Victaulic Couplings in Piping Stress Analysis Programs," Victaulic Company, WP-18 6685 Rev. B, Mar. 19, 2013, 19 pages.
International Search Report and Written Opinion issued in PCT Application No. PCT/US2018/063977, dated Feb. 15, 2019.
International Search Report and Written Opinion issued in PCT Application No. PCT/US2018/063970, dated Mar. 5, 2019.
Non-Final Office Action issued in corresponding U.S. Appl. No. 16/170,695, dated Feb. 12, 2019.
Non-Final Office Action issued in corresponding U.S. Appl. No. 16/210,749, dated Feb. 25, 2019.
Non-Final Office Action issued in corresponding U.S. Appl. No. 15/183,387, dated Mar. 6, 2019.
Canadian Office Action issued in Canadian Application No. 2,943,275, dated Mar. 1, 2019.
Canadian Office Action issued in Canadian Application No. 2,936,997, dated Jan. 30, 2019.
International Search Report and Written Opinion issued in PCT Application No. PCT/US2019/016635, dated Apr. 10, 2019.
Notice of Allowance issued in corresponding U.S. Appl. No. 15/635,028, dated Apr. 23, 2019.
Schlumberger, "Jet Manual 23, Fracturing Pump Units, SPF/SPS-343, Version 1.0," Jan. 31, 2007, 68 pages.
Stewart & Stevenson, "Stimulation Systems," 2007, 20 pages.
Luis Gamboa, "Variable Frequency Drives in Oil and Gas Pumping Systems," Dec. 17, 2011, 5 pages.
"Griswold Model 811 Pumps: Installation, Operation and Maintenance Manual, ANSI Process Pump," 2010, 60 pages.
International Search Report and Written Opinion issued in PCT Application No. PCT/US2019/027584, dated Jul. 9, 2019.
Canadian Office Action issued in Canadian Application No. 2,964,597, dated Jun. 20, 2019.
Canadian Office Action issued in Canadian Application No. 2,833,711, dated May 30, 2019.
Non-Final Office Action issued in corresponding U.S. Appl. No. 16/210,749, dated Jun. 11, 2019.
Non-Final Office Action issued in corresponding U.S. Appl. No. 16/268,030, dated May 10, 2019.
Non-Final Office Action issued in corresponding U.S. Appl. No. 16/268,030, dated Jun. 7, 2019.
International Search Report and Written Opinion issued in PCT Application No. PCT/US2019/037493, dated Sep. 11, 2019.
Canadian Office Action issued in Canadian Application No. 2,936,997, dated Oct. 1, 2019.
Non-Final Office Action issued in corresponding U.S. Appl. No. 15/356,436, dated Aug. 19, 2019.
Non-Final Office Action issued in corresponding U.S. Appl. No. 16/152,732, dated Oct. 2, 2019.
Non-Final Office Action issued in corresponding U.S. Appl. No. 16/268,030, dated Sep. 11, 2019.
Non-Final Office Action issued in corresponding U.S. Appl. No. 16/385,070, dated Oct. 11, 2019.
Non-Final Office Action issued in corresponding U.S. Appl. No. 15/994,772, dated Sep. 3, 2019.
Non-Final Office Action issued in corresponding U.S. Appl. No. 16/443,273, dated Sep. 20, 2019.
International Search Report and Written Opinion issued in PCT Application No. PCT/US2019/055325, dated Jan. 2, 2020.
Notice of Allowance issued in corresponding U.S. Appl. No. 16/570,331, dated Jan. 9, 2020.
Non-Final Office Action issued in corresponding U.S. Appl. No. 16/597,008, dated Dec. 23, 2019.
Non-Final Office Action issued in corresponding U.S. Appl. No. 16/597,014, dated Jan. 10, 2020.
Non-Final Office Action issued in corresponding Application No. 16/564,186, dated Dec. 6, 2019.
International Search Report and Written Opinion issued in PCT Application No. PCT/US2019/051018, dated Nov. 26, 2019.
International Search Report and Written Opinion issued in PCT Application No. PCT/US2019/055323, dated Feb. 11, 2020.
Non-Final Office Action issued in corresponding U.S. Appl. No. 16/152,695, dated Mar. 3, 2020.

(56) References Cited

OTHER PUBLICATIONS

Final Office Action issued in corresponding U.S. Appl. No. 15/356,436, dated Mar. 31, 2020.
Non-Final Office Action issued in corresponding U.S. Appl. No. 14/881,535, dated May 20, 2020.
Non-Final Office Action issued in corresponding U.S. Appl. No. 16/458,696, dated May 22, 2020.
International Search Report and Written Opinion issued in PCT Application No. PCT/US2020/023809, dated Jun. 2, 2020.
Karin, "Duel Fuel Diesel Engines," (2015). Taylor & Francis, pp. 62-63, retrieved from https://app.knovel.com/hotlink/oc/id:kpDFDE0001/dual-fuel-diesel-engines/duel-duel-diesel-engines (Year 2015).
Goodwin, "High-voltage auxiliary switchgear for power stations," Power Engineering Journal, 1989, 10 pg. (Year 1989).
Canadian Office Action issued in Canadian Application No. 2,944,968, dated Aug. 17, 2020.
International Search Report and Written Opinion issued in PCT Application No. PCT/US2020/023912, dated Jun. 23, 2020.
International Search Report and Written Opinion issued in PCT Application No. PCT/US2020/000017, dated Jul. 22, 2020.
Non-Final Office Action issued in corresponding U.S. Appl. No. 16/385,070, dated Aug. 4, 2020.
Non-Final Office Action issued in corresponding U.S. Appl. No. 16/404,283, dated Jun. 29, 2020.
Non-Final Office Action issued in corresponding U.S. Appl. No. 16/728,359, dated Jun. 29, 2020.
Non-Final Office Action issued in corresponding U.S. Appl. No. 16/377,861, dated Jun. 22, 2020.
Canadian Office Action issued in Canadian Application No. 2,933,444, dated Aug. 18, 2020.
Non-Final Office Action issued in corresponding U.S. Appl. No. 15/486,970, dated Jun. 22, 2017.
Non-Final Office Action issued in corresponding U.S. Appl. No. 15/487,656, dated Jun. 23, 2017.
Non-Final Office Action issued in corresponding U.S. Appl. No. 15/487,694, dated Jun. 26, 2017.
Final Office Action issued in corresponding U.S. Appl. No. 15/486,970, dated Oct. 13, 2017.
Non-Final Office Action issued in corresponding U.S. Appl. No. 14/884,363, dated Sep. 5, 2017.
Notice of Allowance issued in corresponding U.S. Appl. No. 15/486,970, dated Feb. 6, 2018.
Non-Final Office Action issued in corresponding U.S. Appl. No. 14/881,535, dated Oct. 6, 2017.
Non-Final Office Action issued in corresponding U.S. Appl. No. 15/145,414, dated Nov. 29, 2017.
Non-Final Office Action issued in corresponding U.S. Appl. No. 15/644,487, dated Nov. 13, 2017.
Notice of Allowance issued in corresponding U.S. Appl. No. 15/235,788, dated Sep. 7, 2022.
Notice of Allowance issued in corresponding U.S. Appl. No. 15/486,970, dated Apr. 2, 2018.
Notice of Allowance issued in corresponding U.S. Appl. No. 15/486,970, dated May 7, 2018.
Final Office Action issued in corresponding U.S. Appl. No. 15/487,656, dated Oct. 13, 2017.
Notice of Allowance issued in corresponding U.S. Appl. No. 15/487,656, dated Mar. 27, 2018.
Notice of Allowance issued in corresponding U.S. Appl. No. 15/487,656, dated Jun. 12, 2018.
Notice of Allowance issued in corresponding U.S. Appl. No. 15/487,694, dated Oct. 24, 2017.
Notice of Allowance issued in corresponding U.S. Appl. No. 15/487,694, dated Jan. 10, 2018.
Notice of Allowance issued in corresponding U.S. Appl. No. 14/884,363, dated Jan. 8, 2018.
Notice of Allowance issued in corresponding U.S. Appl. No. 14/884,363, dated Mar. 30, 2018.
Notice of Allowance issued in corresponding U.S. Appl. No. 14/884,363, dated Apr. 17, 2018.
Final Office Action issued in corresponding U.S. Appl. No. 14/881,535, dated May 17, 2018.
Non-Final Office Action issued in corresponding U.S. Appl. No. 14/881,535, dated Dec. 20, 2018.
Non-Final Office Action issued in corresponding U.S. Appl. No. 14/881,535, dated Oct. 4, 2019.
Final Office Action issued in corresponding U.S. Appl. No. 14/881,535, dated Jan. 4, 2021.
Non-Final Office Action issued in corresponding U.S. Appl. No. 14/881,535, dated Jul. 21, 2021.
Notice of Allowance issued in corresponding U.S. Appl. No. 14/881,535, dated May 12, 2022.
Notice of Allowance issued in corresponding U.S. Appl. No. 14/881,535, dated May 26, 2022.
Notice of Allowance issued in corresponding U.S. Appl. No. 15/145,414, dated May 29, 2018.
Notice of Allowance issued in corresponding U.S. Appl. No. 15/145,414, dated Aug. 31, 2018.
Final Office Action issued in corresponding U.S. Appl. No. 15/644,487, dated Mar. 12, 2018.
Non-Final Office Action issued in corresponding U.S. Appl. No. 15/644,487, dated Jul. 25, 2018.
Notice of Allowance issued in corresponding U.S. Appl. No. 15/644,487, dated Dec. 31, 2018.
Notice of Allowance issued in corresponding U.S. Appl. No. 15/644,487, dated Feb. 12, 2019.
Notice of Allowance issued in corresponding U.S. Appl. No. 15/644,487, dated Mar. 28, 2019.
Canadian Office Action issued in Canadian Application No. 2,833,711, dated Mar. 2, 2018.
Canadian Office Action issued in Canadian Application No. 2,928,711, dated Apr. 18, 2018.
Non-Final Office Action issued in corresponding U.S. Appl. No. 15/183,387, dated Apr. 2, 2018.
Non-Final Office Action issued in corresponding U.S. Appl. No. 15/235,716, dated May 29, 2018.
Canadian Office Action issued in Canadian Application No. 2,866,697, dated Jun. 22, 2018.
Non-Final Office Action issued in corresponding U.S. Appl. No. 15/217,081, dated Oct. 4, 2018.
International Search Report and Written Opinion issued in PCT Application No. PCT/US2018/040683, dated Sep. 19, 2018.
Canadian Office Action issued in Canadian Application No. 2,945,281, dated Sep. 28, 2018.
International Search Report and Written Opinion issued in PCT Application No. PCT/US2018/054542, dated Jan. 2, 2019.
International Search Report and Written Opinion issued in PCT Application No. PCT/US2018/054548, dated Jan. 2, 2019.
International Search Report and Written Opinion issued in PCT Application No. PCT/US2018/055913, dated Dec. 31, 2018.
International Search Report and Written Opinion issued in PCT Application No. PCT/US2018/057539, dated Jan. 4, 2019.
Non-Final Office Action issued in corresponding U.S. Appl. No. 16/160,708, dated Dec. 12, 2018.
IPIECA About Us page, 2015, 1 page.
Briggs, "Development of a Downhole Television Camera," Oceanographic Engineering Corporation, 1964, 1 page.
Hurst et al., "Development and Application of 'Frac' Treatments in the Permian Basin," SPE 405-G, vol. 204, 1955, 8 pages.
Smith et al., "Fracture Width-Design vs. Measurement," Amoco Production Co., Society of Petroleum Engineers of Aime, Spe 10965, 1982, 9 pages.
Appl et al., "A Viewing Lens for High Pressure Applications," Society of Petroleum Engineers of AIME, SPE-299, 1962, 7 pages.
Taylor, "Efficiency: Watchword of the Oil Industry," Financial Analysts Journal, 2018, 4 pages.
Pritchard, "U.S. Color Television Fundamentals: A Review," SMPTE Journal, Nov. 1977, vol. 86, 10 pages.
Moxastore website, listing for NPORTIA5250, 2015, 2 pages.
Moxastore website, About Us, 2015, 1 page.
Moxastore website, Homepage, 2015, 2 pages.

(56) References Cited

OTHER PUBLICATIONS

Moxastore website, listing for Moxa 802.11 Ethernet to Serial, 2016, 1 page.
Amazon.com listing for Global Cache iTach, IP to Serial with PoE (IP2SL-P) by Global Cach, 2014, 3 pages.
Amazon.com listing for SainSmart TCP/IP Ethernet to Serial RS232 RS485 Intelligent Communication Converter by SainSmart, 2014, 4 pages.
Amazon.com listing for TCP/IP Ethernet to Serial RS232 RS485 RS422 Converter by Atc, 2014, 2 pages.
Amazon.com listing for StarTech.com 1 Port RS232 Serial to IP Ethernet Converter (NETRS2321P) by StarTech, 2014, 4 pages.
Amazon.com listing for StarTech NETRS2321E 1 Port RS-232/422/485 Serial over IP Ethernet Device Server by StarTech, 2014, 4 pages.
Osha-Niosh Hazard Alert: Worker Exposure to Silica during Hydraulic Fracturing, U.S. Department of Labor, 2012, 15 pages.
Avallone et al., "Marks' Standard Handbook for Mechanical Engineers 11th Edition," McGraw-Hill, 2007, 5 pages.
Fink, "Standard Handbook for Electrical Engineers," Thirteenth Edition, McGraw-Hill, ISBN: 0-07-020984-7, 7 pages (excerpts) (Part 1).
Fink, "Standard Handbook for Electrical Engineers," Thirteenth Edition, McGraw-Hill, ISBN: 0-07-020984-7, 7 pages (excerpts) (Part 2).
Fink, "Standard Handbook for Electrical Engineers," Thirteenth Edition, McGraw-Hill, ISBN: 0-07-020984-7, 6 pages (excerpts) (Part 3).
Roe, "Practices and Procedures of Industrial Electrical Design," McGraw-Hill, 1972, ISBN: 0-07-053390-3, 14 pages (Part 1).
Roe, "Practices and Procedures of Industrial Electrical Design," McGraw-Hill, 1972, ISBN: 0-07-053390-3, 11 pages (Part 2).
Camara, "Electrical Engineering Reference Manual for the Electrical and Computer PE Exam—Sixth Edition," Professional Publications, Inc., ISBN: 1-888577-56-8, 2002, 17 pages (Part 1).
Camara, "Electrical Engineering Reference Manual for the Electrical and Computer PE Exam—Sixth Edition," Professional Publications, Inc., ISBN: 1-888577-56-8, 2002, 25 pages (Part 2).
Camara, "Electrical Engineering Reference Manual for the Electrical and Computer PE Exam—Sixth Edition," Professional Publications, Inc., ISBN: 1-888577-56-8, 2002, 20 pages (Part 3).
Camara, "Electrical Engineering Reference Manual for the Electrical and Computer PE Exam—Sixth Edition," Professional Publications, Inc., ISBN: 1-888577-56-8, 2002, 19 pages (Part 4).
Camara, "Electrical Engineering Reference Manual for the Electrical and Computer PE Exam—Sixth Edition," Professional Publications, Inc., ISBN: 1-888577-56-8, 2002, 21 pages (Part 5).
PPI Course Catalog, 2004, available at: https://web.archive.org/web/20040220012405/http://ppi2pass.com/catalog/servlet/MyPpi_fl_corner-catalog.pdf, 16 pages.
"Teaching an Electrical and Computer Engineering PE Exam Review Course," PPI, 2003, available at: https://web.archive.org/web/20031223100101/http://ppi2pass.com/catalog/servlet/MyPpi_pg_corner-teachee.html, 2 pages.
"Instructors Corner," PPI, 2003, available at: https://web.archive.org/web/20031219232547/http://ppi2pass.com/catalog/servlet/MyPpi_pg_corner-corner.html, 2 pages.
EE-Reference Online Index, 2004, available at: https://web.archive.org/web/20040731020344/http://ppi2pass.com/catalog/servlet/MyPpi_fl_indices-EERMindex.pdf, 41 pages.
EE-Reference Online Introduction, 2004, available at: https://web.archive.org/web/20041013101643/http://ppi2pass.com/catalog/servlet/MyPpi_fl_indices-EERMIntro.pdf, 12 pages.
"Electrical PE Exam Review Products," PPI Online Catalog, 2004, available at: https://web.archive.org/web/20040214233851/http://ppi2pass.com/catalog/servlet/MyPpi_ct_ELECTRICAL, 7 pages.
"The PPI Online Catalog," 2004, available at: https://web.archive.org/web/20040215142016/http://ppi2pass.com/catalog/servlet/MyPpi_ct_MAIN, 2 pages.
Homepage of Professional Publications, Inc., 2004, available at: https://web.archive.org/web/20040209054901/http:/ppi2pass.com/catalog/servlet/MyPpi, 1 page.
"What PPI Customers Say," 2003, available at: https://web.archive.org/web/20031226130924/http://ppi2pass.com/catalog/servlet/MyPpi_pg_comments-EEcomments.html, 2 pages.
"About PPI," 2003, available at: https://web.archive.org/web/20031219231426/http://ppi2pass.com:80/catalog/servlet/MyPpi_pg_aboutppi.html, 1 page.
Amazon.com listing of EE-Reference, 2007, available at: https://web.archive.org/web/20070103124447/https://www.amazon.com/Electrical-Engineering-Reference-Manual-Computer/dp/1888577568/, 7 pages.

\* cited by examiner

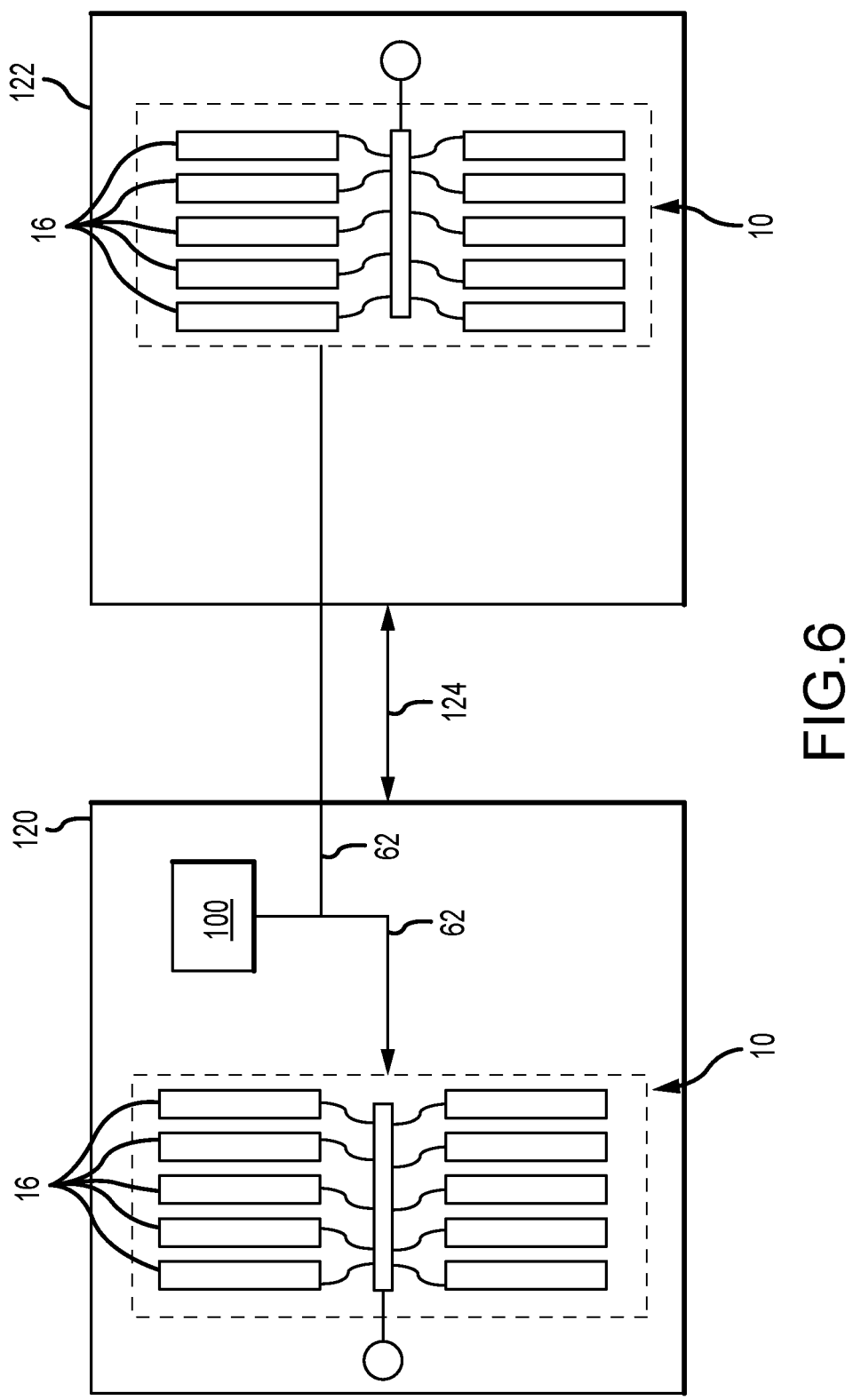

CONSTANT VOLTAGE POWER DISTRIBUTION SYSTEM FOR USE WITH AN ELECTRIC HYDRAULIC FRACTURING SYSTEM

CROSS REFERENCE TO RELATED APPLICATIONS

This application is a continuation of U.S. patent application Ser. No. 18/097,574, filed Jan. 17, 2023 titled "CONSTANT VOLTAGE POWER DISTRIBUTION SYSTEM FOR USE WITH AN ELECTRIC HYDRAULIC FRACTURING SYSTEM," now U.S. Pat. No. 11,815,082 issued Nov. 14, 2023, which is a continuation of U.S. patent application Ser. No. 17/533,183, filed Nov. 23, 2021 titled "CONSTANT VOLTAGE POWER DISTRIBUTION SYSTEM FOR USE WITH AN ELECTRIC HYDRAULIC FRACTURING SYSTEM," now U.S. Pat. No. 11,555,491 issued Jan. 17, 2023, which is a continuation of U.S. patent application Ser. No. 15/829,419, filed Dec. 1, 2017, titled "CONSTANT VOLTAGE POWER DISTRIBUTION SYSTEM FOR USE WITH AN ELECTRIC HYDRAULIC FRACTURING SYSTEM," now U.S. Pat. No. 11,181,107, issued Nov. 23, 2021, which claims priority to and the benefit of U.S. Provisional Application Ser. No. 62/429,499, filed Dec. 2, 2016, titled "CONSTANT VOLTAGE POWER DISTRIBUTION SYSTEM FOR USE WITH AN ELECTRIC HYDRAULIC FRACTURING SYSTEM," the full disclosures of which are hereby incorporated by reference herein for all intents and purposes.

BACKGROUND

1. Technical Field

This disclosure relates generally to hydraulic fracturing and more particularly to systems and methods for supplying constant voltage power to hydraulic fracturing equipment.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant, chemicals, and the like into the fluid, cranes, wireline units, and many other components that all perform different functions to carry out fracturing operations.

Usually in fracturing systems, the fracturing equipment runs on diesel motors or by other internal combustion engines. Such engines may be very powerful, but have certain disadvantages. Diesel is more expensive, is less environmentally friendly, less safe, and heavier to transport than natural gas. For example, diesel engines are very heavy, and so require the use of a large amount of heavy equipment, including trailers and trucks, to transport the engines to and from a well site. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations require constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Turbine use is well known as a power source, but is not typically employed for powering mobile fracturing operations.

Utilizing electric power sources to provide power to electric pumps presents its own challenges. Large scale power systems may generate three phase alternating current (AC) electricity at 13.8 kV. Pumps and other equipment, however, may operate at lower voltages, and as a result, transformers are utilized to step down the voltage. These transformers are large, expensive, and difficult to move from well site to well site. Moreover, adding additional equipment complicates the mobilization and de-mobilization process, for example, the processes to properly configure and run the power lines between equipment. Furthermore, cable management may cause problems at the well site by taking up large areas to keep personnel away from the cables. Additionally, increasing the number of cables and electrical equipment at the well site presents potential hazards, such as equipment shortages, personnel being in high voltage areas, and the like.

SUMMARY

In an embodiment, a hydraulic fracturing system for fracturing a subterranean formation includes a turbine generator for producing electricity at a well site, the turbine generator producing electrical energy at a voltage. The system also includes an electric pump electrically coupled to the turbine generator and receiving operative power from the turbine generator. The system further includes switch gear units arranged between the electric pump and the turbine generator, the switch gear units distributing electrical energy from the turbine generator to the electric pump, wherein the voltage remains substantially constant from the turbine generator to the electric pump.

In an embodiment, a hydraulic fracturing system for fracturing a subterranean formation includes a turbine generator for producing electricity at a well site, the turbine generator producing electrical energy at a voltage. The system also includes an electric pump electrically coupled to the turbine generator and receiving operative power from the turbine generator. The system further includes switch gear units arranged between the electric pump and the turbine generator, the switch gear units distributing electrical energy from the turbine generator to the electric pump, wherein the voltage remains substantially constant from the turbine generator to the electric pump. The system also includes a variable frequency drive connected to the motor to control the speed of the motor, wherein the variable frequency drive frequently performs electric motor diagnostics to prevent damage to the motor.

Other aspects and features of the present disclosure will become apparent to those of ordinary skill in the art after reading the detailed description herein and the accompanying figures.

BRIEF DESCRIPTION OF DRAWINGS

The foregoing aspects, features, and advantage of embodiments of the present disclosure will further be appreciated when considered with reference to the following description of embodiments and accompanying drawings. In describing embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

FIG. 6 is a schematic block diagram of an embodiment of a power distribution system, in accordance with embodiments of the present disclosure;

Figure 1:
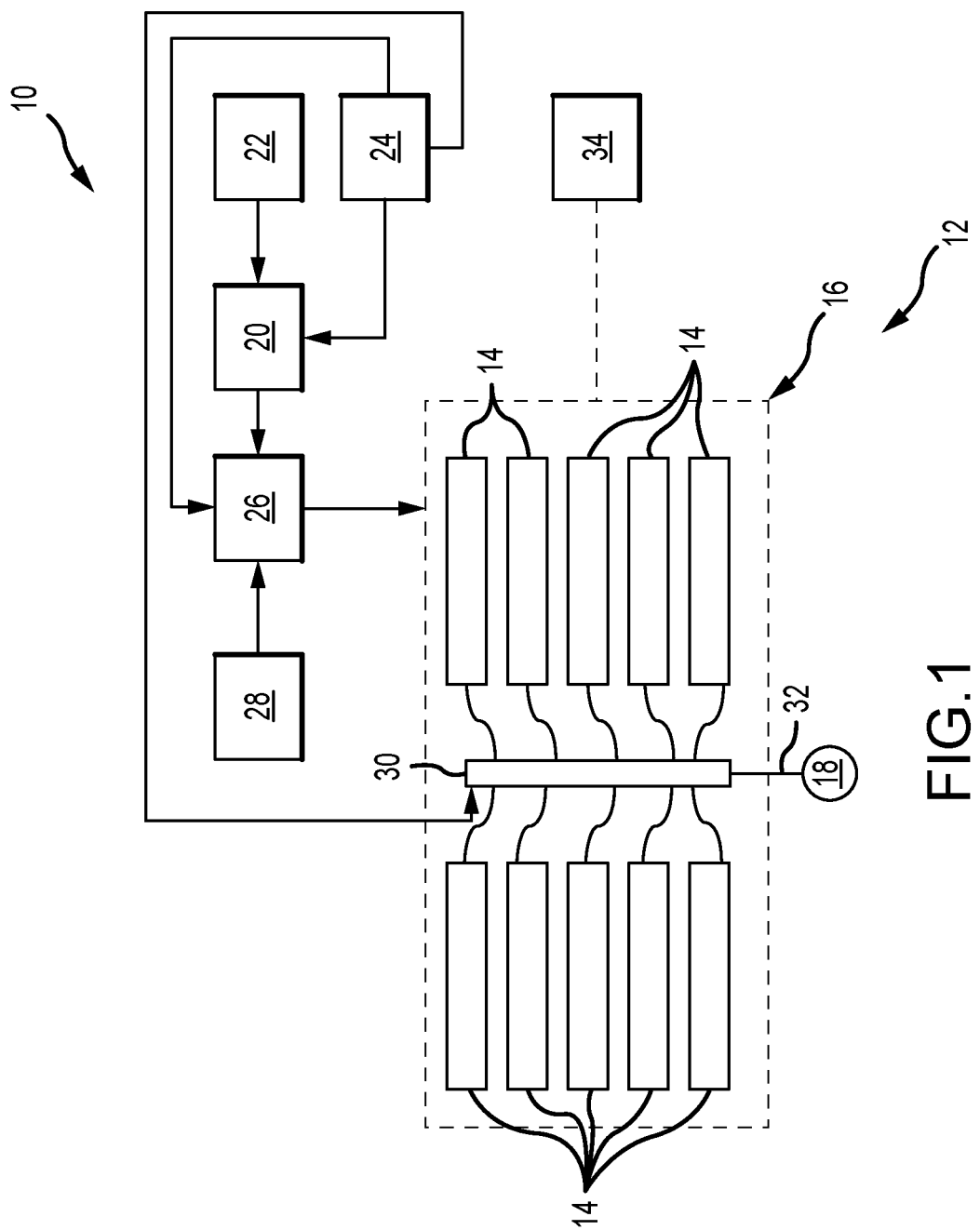
FIG. 1 is a schematic block diagram of an embodiment of a hydraulic fracturing system, in accordance with embodiments of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, recitations of steps of a method should be understood as being capable of being performed in any order unless specifically stated otherwise. Furthermore, the steps may be performed in series or in parallel unless specifically stated otherwise.

Embodiments of the present disclosure describe systems and methods for power distribution for hydraulic fracturing operations. In various embodiments, equipment at the hydraulic fracturing site utilizes power at substantially the same voltage as it is produced at. In other words, power generated at the site, for example by a turbine generator, is not stepped down, for example via a transformer, before it is utilized at the equipment. For example, equipment used in hydraulic fracturing operations may be specifically designed to operate at the voltage produced by the turbine generator. Accordingly, costs associated with operations may be reduced by eliminating the transformers typically used and also by reducing complexity at the site regarding mobilization and de-mobilization. That is, by eliminating equipment there may be fewer electrical connections at the site, which simplifies installation and also reduces the likelihood of errors during installation. Furthermore, embodiments of the present disclosure include various pumping configurations. For example, one or more pumping trailers may include pumps, variable frequency drives, or combinations thereof. In certain embodiments, the pumps and variable frequency drives may be arranged on different trailers and/or skids, thereby freeing up space to include additional equipment on the dedicated skids. In this manner, the different configurations may be utilized to simplify staging at the well site.

Further described herein are systems and methods of power distribution for an electric hydraulic fracturing system, where the voltage of the electricity remains substantially constant between where the electricity is generated and where the electricity is consumed. In various embodiments, the power distribution system eliminates transformers that condition electricity used by pumps to pressurize fracturing fluid. For example, the transformers may be 3500 kVA transformers that convert three phase AC electricity at 13.8 kV to three-phase AC electricity at 600 V. Additionally, in various embodiments, the power distribution system may include one or more transformers that condition power only for particularly selected equipment. For example, the transformers may include AC-DC transformers (e.g., 5 V, 12 V, 24 V, etc.), AC-AC transformers (e.g., 120 V and 240 V), and DC-AC inverters. In various embodiments, various equipment described herein can be onboard or mounted to larger devices and certain equipment may operate at less than 5 kVA. In various embodiments, transformers used with power generation and distribution grids may not be included to thereby simplify the well site and reduce costs.

In various embodiments, an electric hydraulic fracturing system may include an auxiliary unit having a trailer on which various devices are mounted. For example, the trailer may include a variable frequency drive ("VFD") that can be used to control the blender discharge motor. Moreover, soft starters for the blender hydraulic motor, soft starters for the hydration unit hydraulic motor, soft starters for blower motors on the mixing equipment (blenders, hydration unit, and dual belt), power electronics (breakers) for the mixing equipment, cable connections for mixing equipment, lower voltage DC and AC transformers, and a large 3500 kVA transformer may further be utilized. Other embodiments may include breaking these components into several units or mounting the components on other hydraulic fracturing equipment.

FIG. 1 is a plan schematic view of an embodiment of a hydraulic fracturing system 10 positioned at a well site 12. In the illustrated embodiment, pump units 14, which make up a pumping system 16, are used to pressurize a slurry solution for injection into a wellhead 18. It should be appreciated that, in certain embodiments, the pump units 14 may be referred to as "pump trucks" or the like. Such recitation is not intended to limit the present disclosure. As used herein, pump units 14 refer to systems including pumps that may be skid mounted, truck mounted, trailer mounted, foundation mounted, or any other reasonable configuration to enable operation at well site. In various embodiments, a pump may be mounted on a skid that is thereafter arranged on a truck or trailer to enable transportation. In embodiments, the truck or trailer may continue to hold or otherwise support the pump during operation. Additionally, in various embodiments, the pump may be removed from the truck or trailer and staged at the well site, for example on a skid, platform, foundation, or the like. A hydration unit 20 receives fluid from a fluid source 22 via a line, such as a tubular, and also receives additives from an additive source 24. It should be appreciated that in various embodiments the additive source 24 may direct additives directly to the blender 26, directly to a missile, or a combination thereof. In an embodiment, the fluid is water and the additives are mixed together and transferred to a blender unit 26 where proppant from a proppant source 28 may be added to form the slurry solution (e.g., fracturing slurry) which is transferred to the pumping system 16 through the low pressure portion of a distribution system 30 (e.g., a manifold). It should be appreciated that the distribution system 30 may include high and low pressure sections. The low pressure sections may receive fluid, such as slurry from the blender, and then be boosted to sufficient pressure for hydraulic fracturing. The high pressure section may consolidate high pressure slurry from the pumps for injection into the well head. The pump units 14 may receive the slurry solution at a first pressure (e.g., 80 psi to 140 psi) and boost the pressure to around 15,000 psi for injection into the wellhead 18. In certain embodiments, the pump units 14 are powered by electric motors.

After being discharged from the pump system 16, the distribution system 30, such as the manifold, receives the slurry solution for injection into the wellhead 18. In various embodiments, the distribution system 30 may include a missile trailer and/or manifold pipe segments that are routed at ground level. These systems may be coupled via low pressure tubing or high pressure piping to enable a variety of configurations particularly selected for individual fracturing jobs. The distribution system 30 consolidates the slurry solution from each of the pump units 14 and includes discharge piping 32 coupled to the wellhead 18. In this manner, pressurized solution for hydraulic fracturing may be injected into the wellhead 18. In the illustrated embodiment, the system further includes a controller 34, which may be utilized to monitor and/or control various aspects of the pumping systems 16.

Figure 2:
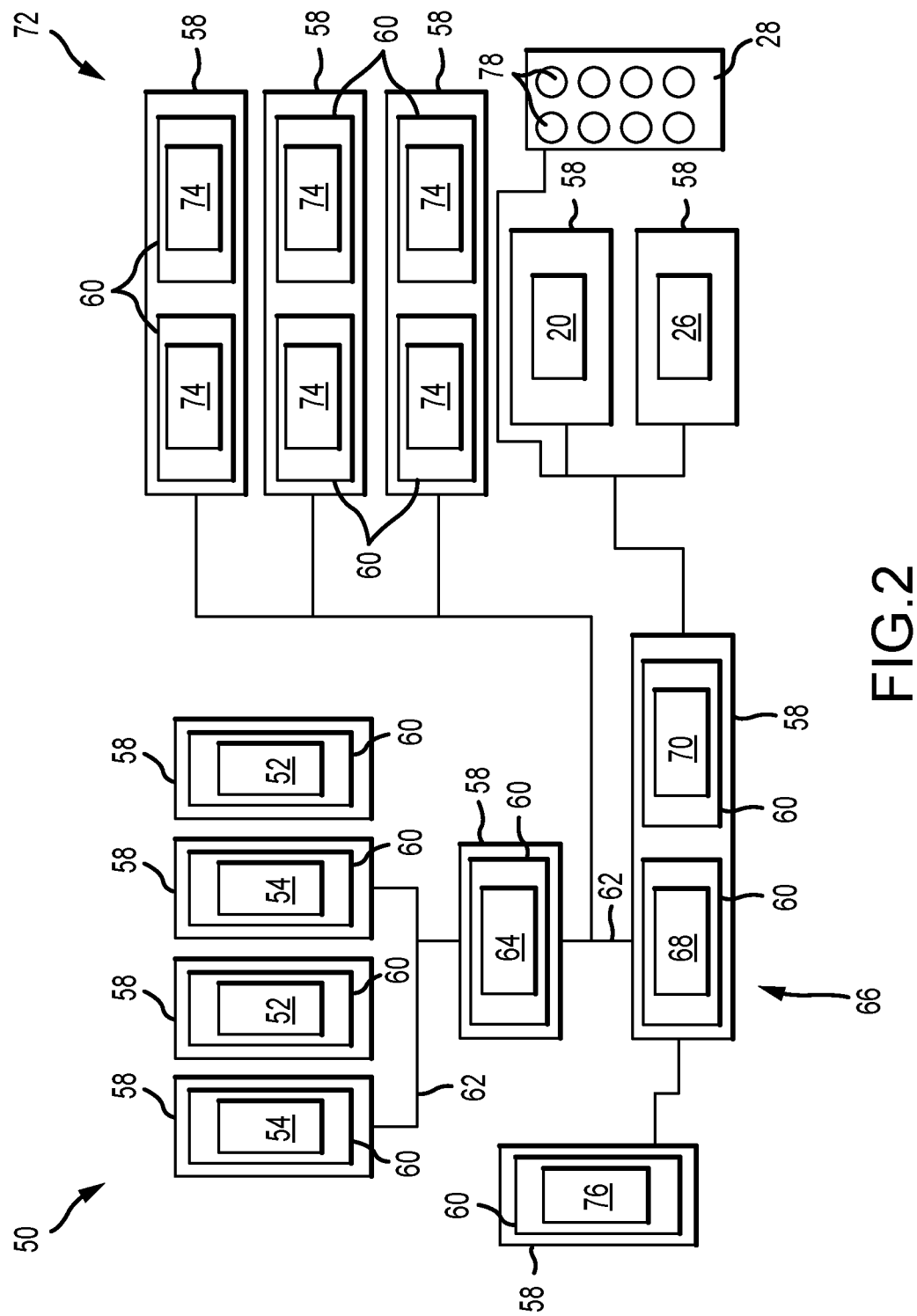
FIG. 2 is a schematic block diagram of an embodiment of a power distribution system, in accordance with embodiments of the present disclosure.

FIG. 2 is a plan schematic view of an embodiment of a power distribution system 50. In the illustrated embodiment, the power distribution system 50 provides electrical power to the hydraulic fracturing system 10, for example to power the pumping systems 16 and/or auxiliary and support equipment such as the hydration unit 20, blender unit 26, and the like. The power distribution system 50 includes a turbine generator 52 and an electronic equipment room 54 (EER). In various embodiments, the turbine generator 52 and/or the electronic equipment room 54 may be mounted on a skid 56 and/or trailer 58 for ease of movement between well sites. Moreover, in embodiments, the turbine generator 52 and associated equipment may also be truck mounted. For example, the turbine generator 52 may be mounted on the trailer 58 within a housing 60 mounted on the trailer. The generator may be natural gas powered, diesel powered, blended-fuel powered, or powered by some other reasonable energy source, and one or more generators can be provided in each housing 60 and/or be mounted on each skid 56 and/or trailer 58. In various embodiments, the EER 54 also includes an independent trailer 58 and housing 60. In the illustrated embodiment, the respective trailers are arranged generally parallel to one another. A walkway elevated from grade may be arranged between the trailers 58 for provide accessibility to the respective housings 60. In various embodiments, power and communications cables 62 can extend between associated equipment, such as switch gear units 64, and EERs 54. It should be appreciated that the cables 62 may be utilized to connect a variety of equipment at the well site and the embodiments illustrated herein have been simplified and do not necessarily illustrate each cable that may be arranged at the well site.

FIG. 2 further includes the switch gear 64. In the illustrated embodiment, the switch gear 64 uses 4160 V three phase power. In various embodiments, the switch gear 64 distributes electricity to transformers, auxiliary units and the like. Moreover, the switch gear 64 may isolate equipment from electricity. That is, the switch gear 64 may control or regulate how/when electrical energy is transmitted to other equipment. In the embodiment illustrated in FIG. 2, the electricity provided to the switch gear 64 is generated by the turbines 52. However, it should be appreciated that other power systems may be utilized to generate and provide electricity to the illustrated switch gear 64. Examples of voltages handled by the switch gear 64 include approximately 13.8 kV, or any voltage that the switch gear 64 may be designed to accommodate. In various embodiments, breakers and fault protection equipment are included in the housing 60 that covers the switch gear 64. Power cables 62 from the turbines 52 can be connected to the switch gear 64 on a side, such as a forward facing side, and an outgoing connector may direct power cables 62 toward other equipment. In various embodiments, the inlet connectors may be on a different portion of the switch gear 64, such as on an opposite site, to thereby provide a visual indicator to operators at the site working to connect and disconnect the cables 62. In the illustrated embodiment, the switch gear 64 is mounted on a trailer 58 and includes the housing 60. However, it should be appreciated that in other embodiments the switch gear 64 may be mounted on a skid 56 and/or on a truck. Accordingly, mobilization and demobilization of the switch gear 64 may be simplified because large equipment, such as cranes, may not be utilized to position the switch gear 64 at the well site 12, and rather, the trailer 58 can be positioned at the desired location.

The embodiment illustrated in FIG. 2 further includes an auxiliary unit 66, which in the illustrated embodiments is mounted on a trailer 58 and within a housing 60. For example, the illustrated auxiliary unit 66 may be a variable frequency drive (VFD) 68 and a 3500 kVA transformer 70. However, as will be described in detail below, various embodiments illustrate a constant voltage power system that eliminates large step down transformers. Various embodiments may include one or more transformers for the benefit of equipment that may not be configured to operate at the same voltage as the power generated by the turbine generators. For example, auxiliary equipment may operate at approximately 600V while the pumps are designed to operate at the same voltage generated by the turbine generators. As such, transformers may be incorporated to provide power to the associated equipment. It should be appreciated that various auxiliary trailers may be utilized to selected equipment at the well site and various configurations may be implemented to enable different designs and configurations to be utilized based on costs, space constraints, availability of equipment, and the like. These components may be mounted on a common trailer 58. In other embodiments, the components may be on separate, independent trailers 58. Moreover, it should be appreciated that the equipment may also be skid-mounted on a truck. In certain embodiments, the VFD 68 may be part of a hydraulic fracturing fleet, which includes a frac pump, the VFD, breakers, soft starts, AC or DC transformers, lights, electronics, and other associated equipment. The VFD 68 may be referred to as a VFD house and may include an independent VFD for each pump coupled to the VFD and/or VFD house 68. For simplicity, the arrangement may be referred to as the VFD 68. The hydraulic fracturing pumps may be on a single common trailer, or broken up with various associated equipment on different trailers. It should be appreciated that while the illustrated auxiliary unit 66 includes the VFD 68 and the transformer 70, that in other embodiments the VFD 68 or other equipment may be collectively, or individually, referred to as auxiliary equipment. Transformer 70 may also be omitted for embodiments utilizing constant voltage. In these embodiments, the step down transformer 70 is not needed because the hydraulic fracturing equipment, such as the pumps, operates at the same voltage generated by the turbine generators.

FIG. 2 further illustrates an electric fracturing pump system 72, which in the illustrated embodiment includes twin fracturing pumps 74. It should be appreciated that while the illustrated embodiment includes dual pumps 74, other embodiments may include one, three, four, five, or any reasonable number of fracturing pumps 74. In the illustrated embodiment, each pump 74 is capable of consuming up to 1.2 MW of electricity. Therefore, the illustrated twin fracturing pumps 74 can draw about 2.5 MW of electricity under full load conditions. In various embodiments, a single pump, motor, VFD, and support equipment may be arranged on the illustrated trailer 58. Moreover, in various embodiments, the fracturing pump system could include major components such as the VFD being separate from the trailer 58. As described above, the fracturing pumps 74 may be on the trailer 58, on the skid 56, on a truck, or any combination thereof. It should be appreciated that the pumps 74 may be configured such that a single motor is arranged to drive both pumps 74. For instance, the pumps 74 may be arranged on either side of a motor such that rotation of the motor drives both pumps 74 simultaneously.

As will be described below, in certain embodiments transformers are removed from the power distribution system 50 and power may be supplied directly from the generators 52. That is, the generation produces power at the same voltage that the pumps receive and utilize the power. However, in certain embodiments, the transformer 70 may be utilized to condition electricity. In the illustrated embodiment, the transformer 70 is separate from the VFD 68 described above, and may be used to condition power for auxiliary equipment. For example, the transformer 70 may be a 3500 kVA transformer that converts three AC 13.8 kV electricity to three phase AC 600 V electricity. Cable connections may be arranged along the transformer 70 receive power output from the generators 52, the switch gear 64, or a combination thereof. In various embodiments, the transformer 70 is mounted on the skid 56 and includes the housing 60. It should be appreciated that the transformer 70 may be mounted on the trailer 58 and/or on a truck. In various embodiments, including the smaller transformer 70 may be advantageous to supply power to secondary equipment. For example, other operators on the site may request use of the electrical power generated by the turbines 52, for example for lighting or wireline operations. By facilitating connections for operators, the well site may be more streamlined and utilize less equipment than if each different operator or vendor brought their own power supplies.

FIG. 2 includes various pieces of auxiliary and support equipment that may be utilized during hydraulic fracturing operations. This equipment may utilize power provided by the power distribution system 50. For example, the hydration unit 20, which is mounted on the trailer 58 in the illustrated embodiment, holds liquids for use with a fracturing process. In various embodiments, a manifold system on the trailer 58 provides selective communication between the container and designated destinations for the liquid in the container.

Furthermore, auxiliary equipment may include the blending unit 26, which may include an electrically powered component that receives energy from the turbine generator 52. The illustrated embodiments includes the blending unit 26 arranged on the trailer 58. In operation, proppant and liquid from the hydration unit 20 are blended together into a slurry via the blending unit 26. A manifold system may be included with the blending unit 26 for selective distribution of the slurry to designated locations.

Moreover, in the illustrated embodiment, an electric data van 76 may be arranged at the well site 12. In the illustrated embodiment, the electric data van 76 is on the trailer 58 and includes the housing 60. However, it should be appreciated that in other embodiments it may be on the skid 56 and/or on a truck. Controls for operating the electric hydraulic fracturing system may be provided in the housing 60 of the electric data van 76, as well as devices for monitoring conditions and operational parameters of components of the electric hydraulic fracturing system. Thus, operations personnel within the data van can control devices of the electric hydraulic fracturing system and monitor their operation.

FIG. 2 further illustrates the proppant source 28, which may be silos, containerized proppant solutions, or the like, to provide proppant to the blender unit 26. The illustrated embodiment includes silos 78 arranged in rows and may further include an electric sand conveyor for moving the proppant from the proppant source 28 to the blender unit 26. It should be appreciated that while silos 78 are illustrated, different proppant delivery solutions, such as containerized solutions, may also be utilized in various embodiments. Accordingly, the well site 12 may include a variety of equipment that may utilize the electrical power generated by the power distribution system 50.

Figure 3:
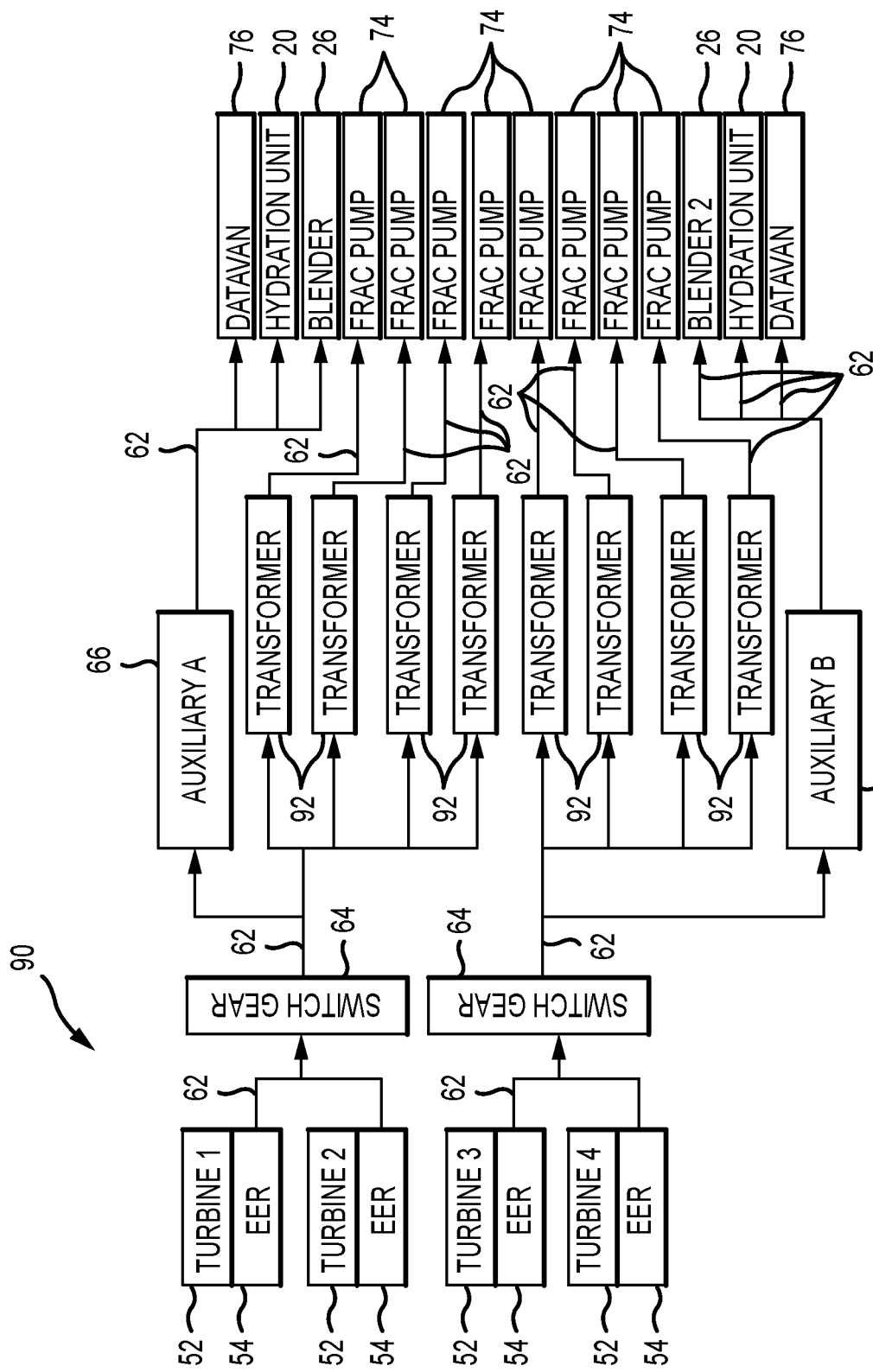
FIG. 3 is a schematic block diagram of an embodiment of a prior art power distribution system, in accordance with embodiments of the present disclosure.

FIG. 3 is a schematic plan view of an embodiment of a power distribution system 90, in which the voltage does not remain constant between the power generation and the use by the equipment. As shown, power is generated by the generators 52, for example at 13.8 kV, and transmitted to the switch gear 64 via cables 62, where it is then transmitted to the transformers 92 and auxiliary units 66. In various embodiments, the transformers 92 step the voltage down to 600 V, which is the voltage typically used for hydraulic fracturing equipment. Additionally, each auxiliary unit 66 may also include a transformer to step down the voltage for the associated equipment. As a result, the illustrated power distribution system 90 is complex, takes up large quantities of space at the well site, is expensive, and has limitations regarding power distribution over distances, for example to adjacent well sites. Systems and methods of the present disclosure overcome these deficiencies, as well as others, for improved power distribution.

Figure 4:
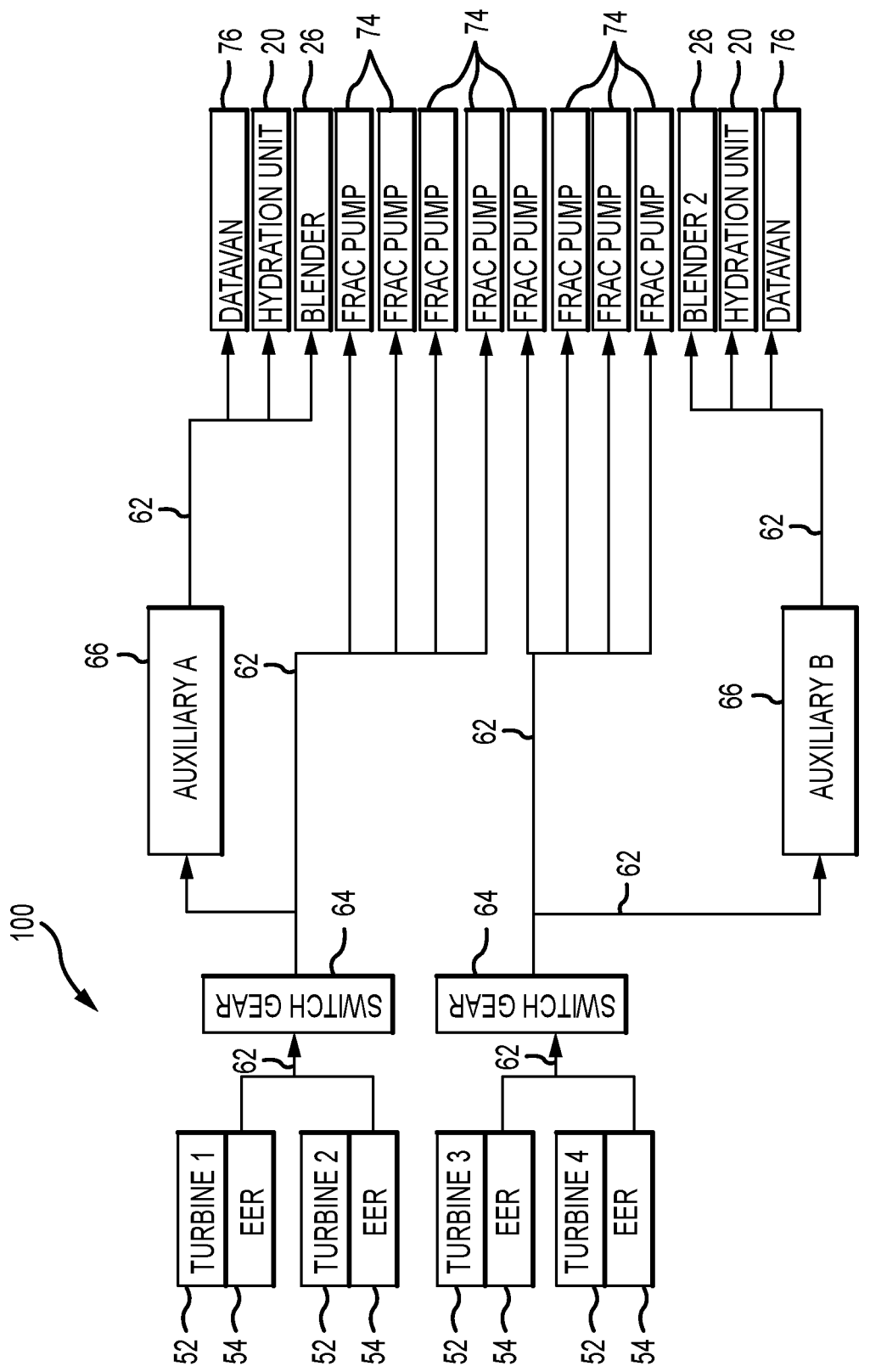
FIG. 4 is a schematic block diagram of an embodiment of a power distribution system, in accordance with embodiments of the present disclosure.

FIG. 4 is an embodiment of a power distribution system 100, in which the voltage remains constant between a location where the power is generated and a location where the power is consumed. For example, the voltage may remain constant between the generator 52 and the pump 74. It should be appreciated that, as used herein, constant refers to power systems where the voltage is not intentionally stepped up or down, for example by a transformer or other equipment, and does not apply to minor line/transmission losses and the like. The illustrated embodiment includes the turbine generators 52 and the EERs 54. It should be appreciated that while the illustrated embodiment includes 4 turbine generators 52, in other embodiments any number of turbine generators 52 may be included. As illustrated, the switch gear units 64 are electrically coupled to the turbine generators 52 via the EERs 54. The illustrated embodiment includes two switch gear units 64, but in other embodiments any number of switch gear units 64 may be used.

FIG. 4 differs from FIG. 3 in that the transformers 92 have been removed, thereby enabling direct power transmission from the switch gear units 64 to the equipment, such as the auxiliary unit 66 and the pumps 74. Advantageously, removing the transformers 92 reduces costs, complexity, and the footprint at the well site. For example, having a large number of cable connections at the well site is hazardous, time intensive during mobilization, maintenance intensive, and creates common failure points. Embodiments the present disclosure eliminate many of the cable connections to thereby improve reliability, reduce potential hazards, and decrease maintenance and mobilization times. In various embodiments, the auxiliary units 66 do not include transformers 70, as described above, and rather are configured to operate at the same voltage generated by the turbines 52. Without the transformers 70, the auxiliary units 66 may be approximately half the size of the auxiliary units 66 illustrated in FIG. 3. In various embodiments, each auxiliary unit 66 includes the VFD 68, as well as associated equipment such as soft starts and the like. It should be appreciated that auxiliary units 66 may incorporate one or more VFDs 68, and that the configuration of the auxiliary units 66 is particularly selected based on conditions at the well site.

In various embodiments, the turbines 52 produce three phase electricity at a voltage of 4,160 V. Electrical cabling 62 enables transmission from the turbines 52 to the switch gear units 64 and other associated conditions. Without the transformers 92 illustrated in FIG. 3, the pumps 74 and auxiliary units 66 are designed to operate at 4,160 V, rather than the 600 V operations described above. Accordingly, operations may commence as normal, but savings are realized for operators by eliminating the need for the transformers 92 and also reducing the footprint at the well site. In various embodiments, equipment utilized at the well site may be configured to operate at the voltage (e.g., 4,160 V in the illustrated embodiment) of the turbine generator 52 output. For example, the blender unit 26, the hydration unit 20, the proppant source 28, and data van 76 may all operate at the voltage produced by the turbine generator 52. In various embodiments, equipment such as insulated gate bipolar transistors and capacitors may be utilized to enable operation of the equipment at higher voltages. Moreover, additional equipment such as electric dust filtration vacuum systems, chemical additive systems, wireline systems, boost pumps, water transfer pumps, pad lighting, pad heating, cranes, and other electrically powered equipment may be configured to operate at the voltage supplied by the turbine generator 52. Moreover, in various embodiments, one or more smaller transformers 70 may be utilized to step down voltage for auxiliary equipment. These smaller transformers 70 have a reduced size compared to the transformers 92 illustrated in FIG. 3 because the anticipated load of the equipment coupled to them is smaller.

In various embodiments, the power supply cables 62 may be diesel locomotive cables or the like to conduct electrical energy from the generators 52 and various other components. These cables 62 may include locking connectors that may be utilized to secure the cable plugs to receptacles on the equipment. Moreover, key locks may be included in various embodiments to prevent the cables 62 from inadvertently being disconnected or swapped, reducing potential safety concerns, equipment damage, or lost operational time. In various embodiments, the switch gear units 64 include electrical hubs with breakers and power generated at the turbines 52 is directed toward the switch gear units 64 via the cables 62, and an electrical bus of the switch gear units 64 may receive and be utilized in distributing the energy to the breakers. These breakers may be associated with outlet connectors for distributing energy to equipment at the well site.

In certain embodiments, the cables 62, switches, connectors, and the like may be numbered or color coded to thereby provide visual indicators to operators regarding proper connection of the equipment. Well sites may include multiple cables running between various pieces of equipment and it is important to get each cable connected to the appropriate receptacle on the equipment in order for operations to commence properly. The use of color coded or numbered connectors enables operators to quickly and conclusively match the correct plug to the correct receptacle, even in low light or bad weather conditions. This practice further helps technicians trouble shoot faults or problems by making it easier to trace cables on the ground between equipment. Cable and receptacle labels can also utilize further markings or indicators to describe which equipment connection should correspond to which receptacle. For example, a power receptacle on a pump may be labeled "Main Power", be the color red, and also be numbered, for example. The corresponding cable may have a red connector with the number and "Main Pump Power" written on it. Additionally, the outlet at the switch gear may further be labeled the color red with a number, and "To Pump" to clearly indicate the proper connections. Accordingly, components may be efficiently and quickly coupled together utilizing the cables.

Systems and methods of the present disclosure may lead to elimination of cables and/or equipment at the well site, thereby reducing space requirements of the electric hydraulic fracturing system. Further advantages are capital cost savings of the eliminated transformers and reduced labor costs associated with installing and cabling of the transformers. Moreover, eliminating the transformers trims equipment and electric connections, thereby lowing potential failure locations in the circuit. Because energy losses are inherent when converting electricity from 13.8 kV to 600 V, removing transformers necessarily increases the efficiency of energy transfer.

Figure 5:
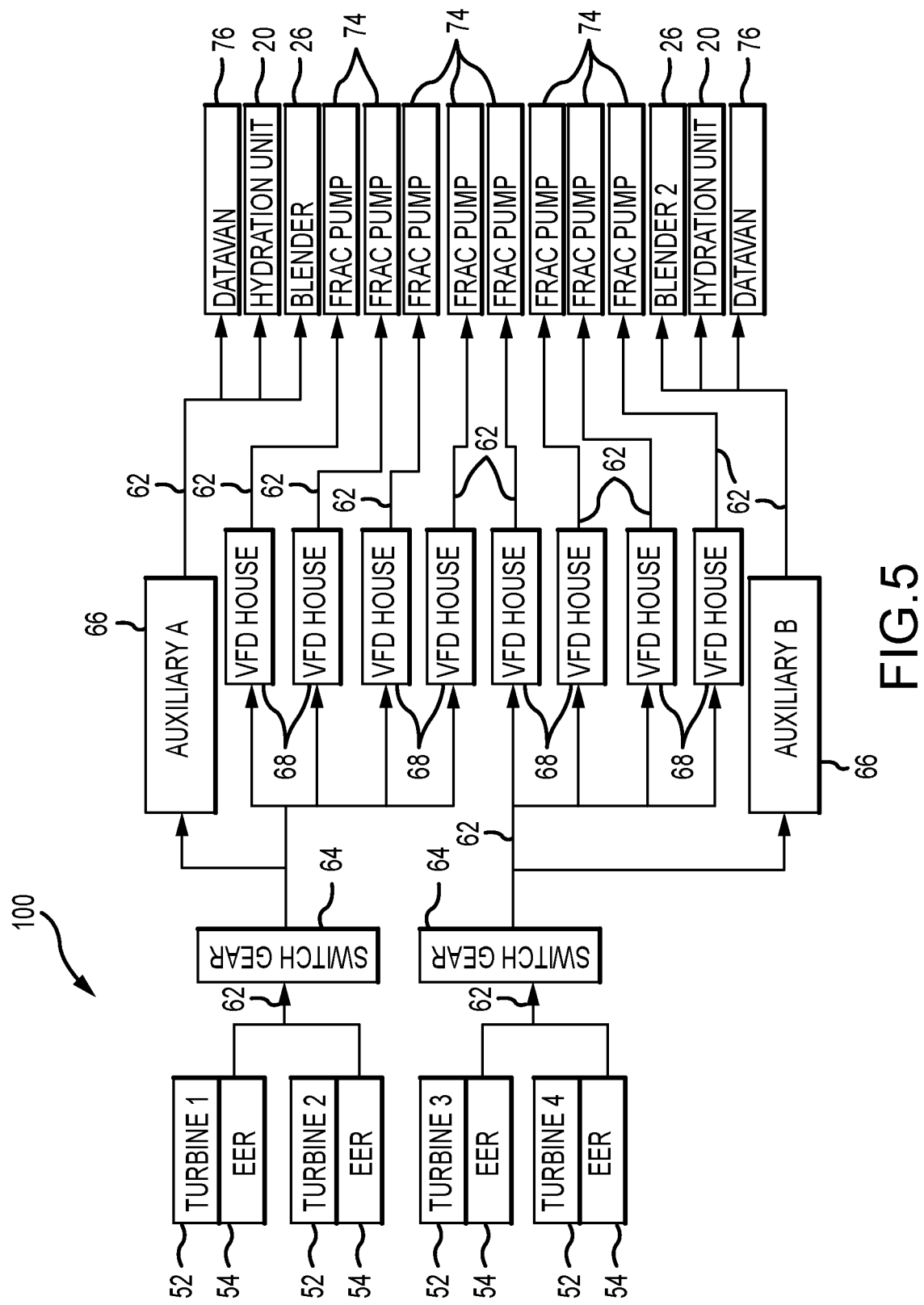
FIG. 5 is a schematic block diagram of an embodiment of a power distribution system, in accordance with embodiments of the present disclosure.

FIG. 5 is a schematic diagram of an embodiment of the power distribution system 100. In the illustrated embodiment, four turbine generators 52 produce electrical energy, for example at 4,160 V. The energy produced by the generators 52 is transmitted to the switch gear units 64, for example via the cables 62. As described above, while the illustrated embodiment may include four generators 52 and two switch gear units 64, other embodiments may have any reasonable number of generators 52 and/or switch gear units 64, as well as other equipment, based on operating conditions at the well site. The illustrated embodiment, the transformers 92 are removed as compared to FIG. 3. Accordingly, as described above, the well site may experience cost savings due to the elimination of equipment and also the simplification of connecting equipment.

In the illustrated embodiment, VFDs 68 are illustrated as separate from the pumps 74, as described above. For example, in various embodiments, the VFDs 68 may be arranged on separate skids and/or trailers. As a result, pump trailers may include multiple pumps or larger pumps due to the empty spaces on the trailers after removal of the VFDs 68. In the illustrated embodiment, the VFDs 68 are arranged within the housing 60 and are configured to operate at the same voltage generated by the generators 52. For example, in various embodiments, the voltage generated by the turbines 52 may be 4,160 V, and therefore the illustrated VFDs 68 operate at 4,160 V when the turbines 52 generate electricity at that voltage. Accordingly, intermediate equipment, such as the transformers 92 to step down the voltage to 600 V, as often used in traditional systems, are eliminated to reduce costs and increase simplicity at the well site.

It should be appreciated that while the illustrated embodiment includes eight frac pumps 74, that other embodiments may include more or fewer pumps 74. For example, in various embodiments 1, 2, 3, 4, 5, 6, 7, 9, 10, or any reasonable number of pumps may be utilized. In embodiments, an electric fleet may utilize 8-11 trailers to perform fracturing operations, or fewer for injection tests, pump downs, or other smaller operations. By eliminating or reducing various components, as described here, such as positioning the VFD 68 on its own skid/trailer, additional pumping capacity may be added or the fleet may be reduced to just 5 or 6 frac pump trailers to perform fracturing operations. Moreover, the pumps may be presented in a variety of configurations. In the embodiment illustrated in FIG. 5, by positioning the VFD 68 on its own trailer/skid, an empty slot may be available on the trailer 58 for the pumps 74. As a result, three pumps 74 may be arranged on each trailer 58. Accordingly, fewer trailers may be arranged at the well site, as described above, while the number of pumps 74 and therefore the pumping capacity is unchanged. Additionally, as described above, the pumping capacity may be increased by adjusting the configuration to include more pumps or larger pumps on the trailers. Furthermore, in embodiments, there may be a single pump 74 arranged on the trailer 58. For example, larger pumps may be utilized that take up more space on the trailers. Embodiments of the present disclosure may include pump trailers having pumps and support equipment arranged in a variety of configurations to thereby enable reduced footprints and flexibility at the well site. For example, pumps may be substantially modular such that pumps can be switched out, for example for maintenance.

FIG. 6 is a schematic diagram of a system in which electrical energy is transmitted from a first well site 120 to a second well site 122. As shown, each well site 120, 122 includes a respective hydraulic fracturing system 10 including pump systems 16 and various support equipment, which has been removed for clarity. The illustrated first well site 120 includes the power distribution system 100, which may include one or more turbine generators 52, switch gear units 64, and the like. However, the second well site 122 does not include an individual power distribution system 100, and rather, receives electrical energy from the power distribution system 100 at the first well site 120. As described above, in various embodiments the turbine generator 52 produces electricity at approximately 4,160 V. This higher voltage can be transmitted over a farther distance 124 than the traditional systems which may run at lower voltage levels. Accordingly, the single power distribution system 100 may be used to generate electricity for more than one well site. Advantageously, costs may be reduced for the producer. For example, costs may be reduced because only a single power distribution system 100 is placed, rented, mobilized, de-mobilized, and operated. In the illustrated embodiment, the cables 62 may be utilized to connect the well sites 120, 122. However, it should be appreciated that other power distribution methods may also be used to transmit electrical energy between the well sites. Furthermore, in various embodiments, there may not be a fleet or hydraulic fracturing system 10 arranged at the first well site 120. However, there may be ongoing operations that may utilize electric power and as a result the transmission may enable the second well site 122 to receive electric power from the first well site 120, thereby eliminating total emissions at the well site 122 because a local power system may not be set up at the second well site 122. For example, in various embodiments, there may be regulations or other restrictions that may limit oil and gas exploration in a certain area, such as within residential areas, near airports, or within federal or state lands, such as parks, wildlife refuges, game lands, and the like. These restrictions may limit or block local emissions, which would make it difficult or unfeasible for certain recovery methods to operate in the area. Embodiments of the present disclosure utilize electric pumps and turbine generators for operations, which have reduced emission compared to other methods, such as diesel powered equipment. Accordingly, power generation may be established at a different location, away from the restricted area, and thereafter transmitted to the restricted area, for example via the cables 62 or by other means, to thereby limit local emissions within the restricted area to zero, near zero, or below regulatory limits. Furthermore, noise at the site may also be reduced. As such, hydraulic fracturing fleets may be utilized in environmentally sensitive areas, or areas that have other regulatory restrictions, with minimal disruption to wildlife or others in the area, while still enabling sufficient well stimulation efforts. In various embodiments, the distance between these sites can be approximately 2 miles. However, in other embodiments, the distance between the sites can be 1 mile, 3 miles, 5 miles, 10 miles, or any other reasonable distance. It should be appreciated that electric power transmission may occur at 600 V, 4,160 V, or 13.8 kV. Furthermore, in various embodiments, as described above, step down transformers may be removed from the system to thereby transmit electrical energy at a constant voltage. Moreover, transmitting the electric power from the first well site 120 to the second well site 122 saves space at the second well site 122. Furthermore, hydraulic fracturing system 10 and power distribution system 100 can be set up on well site 120. Upon the completion of stimulation operations on well site 120, fracturing system 10 can be moved to well site 122 while power distribution system 100 stays on completed well site 120. Electrical power can then be transmitted from well site 120 to well site 122 to power fracturing system 10 to resume operations on well site 122. Accordingly, embodiments of the present disclosure describe a fracturing system that enables fast mobilization between well sites because certain equipment, such as the power distribution system 100 is not moved to different sites. Moreover, subsequent well sites may have a smaller footprint because equipment may remain at the first well site.

Figure 7A:
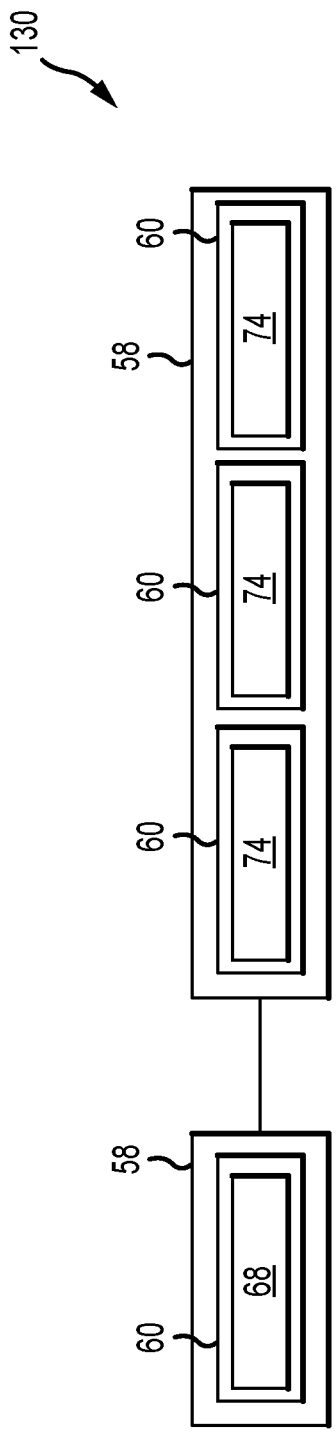
FIG. 7A is a schematic block diagram of a pumping configuration, in accordance with embodiments of the present disclosure.

FIG. 7 includes schematic diagrams of a pumping configuration 130 including a variety of configurations for the pump 74, VFD 68, and associated equipment. That is, FIG. 7A includes an embodiment of the pump trailer 58 including three pumps 74 and a second trailer 58 for the VFD 68, which as described above may be referred to as a VFD house that includes an independent VFD for each of the pumps 74 arranged on the trailer 58. As described above, by removing the VFD 68 from the trailer 58 holding the pumps 74, an empty space is formed to thereby hold an additional pump. As such, a larger number of pumps may be arranged at the well site with a reduced number of trailers 58. It should be appreciated that while the illustrated embodiment discusses using trailers 58, in other embodiments skids 56 and/or trucks may be utilized to hold and support the equipment.

Figure 7B:
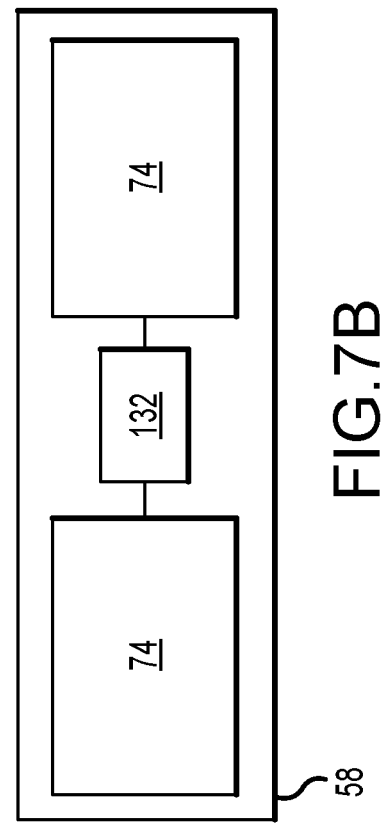
FIG. 7B is a schematic block diagram of an embodiment of a pumping configuration, in accordance with embodiments of the present disclosure.

FIG. 7B illustrates a pumping configuration in which the pair of pumps 74 are powered by a common motor 132. In the illustrated embodiment, the motor 132 is between the pumps 74. As such, less space is occupied on the pumping trailer 58 because the motor 132 is utilized to provide power to two different pumps 74.

Figure 8:
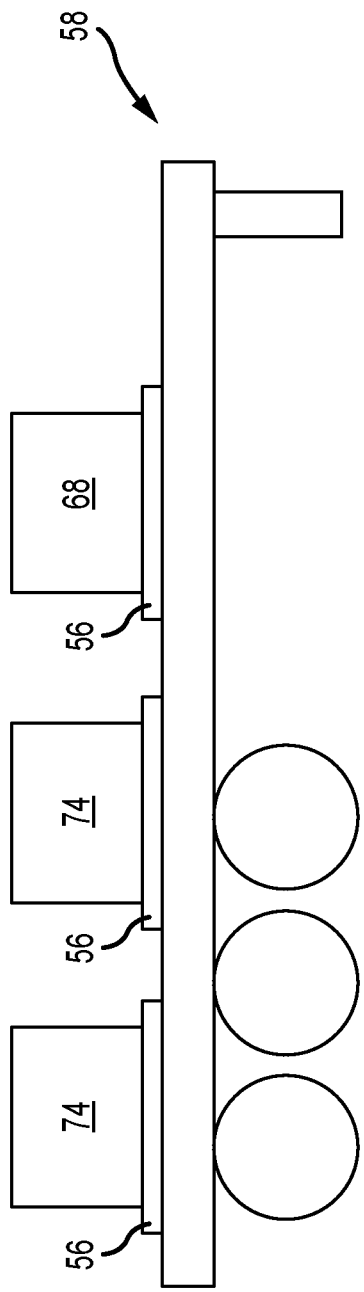
FIG. 8 is a schematic block diagram of an embodiment of a pumping trailer, in accordance with embodiments of the present disclosure.

FIG. 8 is a schematic diagram of the trailer 58 receiving skid-mounted equipment. In various embodiments, equipment utilized at the well site 12 may be mounted on the skid 56 to enable quick and easy mobilization, de-mobilization, and configuration at the well site. For example, equipment may be transported to the well site 12 on the trailer 58, which receives the skid-mounted equipment. Thereafter, at the well site 12, the equipment may be off-loaded from the trailer 58 and arranged at appropriate locations at the well site 12. However, in other embodiments, the skid-mounted equipment may remain on and be utilized while stationed on the trailer 58. In various embodiments, the skid-mounted equipment may be substantially modular, such that equipment may be swapped out with other skid-mounted equipment for maintenance and repairs. In the illustrated embodiment, the trailer 58 includes pumps 74 and the VFD 68, all mounted on respective skids 56. In operation, the equipment may be used while on the trailer 58 or removed from the trailer 58 and staged at the well site 12. In this manner, the well site 12 has increased flexibility, which is advantageous at well sites 12 with small staging areas or well sites 12 that are crowded with other equipment.

Various embodiments described here discuss the pumps 74. It should be appreciated that pumps 74 may refer to the pumps 74 and/or pump systems that include one or more pumps on the trailer 58, skid 56, or a truck. In various embodiments, the pump systems may include a motor (e.g., electric motor, AC induction motors, permanent magnetic motors, DC motors, etc.), a power end including gear systems to convert rotational movement into lateral movement, and a fluid end which may include valves or a manifold to direct the fluid from the pump. Moreover, the pumps 74 may be any type of suitable pump, such as reciprocating, centrifugal, positive displacement, rotary (e.g., gear pumps, screw pumps, rotary vane pumps), progressing cavity, roots-type, peristaltic, plunger, hydraulic ram, velocity, or any other reasonable type of pumps.

It should be appreciated that while various embodiments described herein discuss voltages such as 4,160 V or 13.8 kV that other voltages may be utilized. For example, other options may include 600 V, 480 V, 240 V, or any other voltage that may be utilized commercially. Frequency can be approximately 50 Hz or 60 Hz. Moreover, in embodiments, the turbine generators 52 may each produce approximately 5.7 MW of electricity. However, other turbine generators 52 producing less electricity or more electricity may be utilized. Additionally, it should be appreciated that the power can be broken up into one or more banks. Moreover, in embodiments, the generators 52 and/or the equipment may be particularly selected based on the power output or generate of the other. For example, in embodiments the generators 52 may produce power at 4,160 V and the associated equipment may also operate at 4,160 V. In other embodiments, the generators 52 may produce power at 600 V and the associated equipment may also operate at 600 V. Accordingly, different configurations may be utilized in order to utilize equipment that operates at the same voltage as power generation equipment.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A hydraulic fracturing system, comprising:
   one or more pump trailers including at least one electric pump, positioned at a well site, receiving electrical energy from a generator, wherein a voltage of the electrical energy is not stepped down or stepped up by one or more transformers; and
   a power distribution system, positioned at the well site, distributing the electrical energy produced by the generator, wherein the voltage received at the power distribution system is not stepped up or stepped down by one or more intermediate transformers.

2. The hydraulic fracturing system of claim 1, further comprising:
   one or more second pump trailers including at least one second electric pump, receiving the electrical energy from the power distribution system, wherein the voltage of the electrical energy is not stepped down or stepped up by the one or more transformers.

3. The hydraulic fracturing system of claim 1, wherein the one or more pump trailers include two or more electric pumps arranged on a common support.

4. The hydraulic fracturing system of claim 1, wherein the generator is a diesel generator.

5. The hydraulic fracturing system of claim 1, further comprising:
   a variable frequency drive connected to a motor associated with the at least one electric pump.

6. The hydraulic fracturing system of claim 5, wherein the at least one electric pump and the variable frequency drive are positioned on a common support structure.

7. The hydraulic fracturing system of claim 5, wherein the at least one electric pump and the variable frequency drive are positioned on different support structures.

8. The hydraulic fracturing system of claim 1, further comprising:
- a blender unit, at the well site, receiving a fluid and proppant, the blender unit combining the fluid and proppant to form a slurry, and the blender unit receiving the electrical energy, wherein the voltage of the electrical energy is not stepped down or stepped up by the one or more transformers; and
- a hydration unit, at the well site, distributing the fluid to the blender unit, and the hydration unit receiving the electrical energy, wherein the voltage of the electrical energy is not stepped down or stepped up by the one or more transformers.

9. The hydraulic fracturing system of claim 1, wherein the voltage is to at least one of 240V, 480 V, 600 V, 4,160 V, or 13.8 kV.

10. A method for hydraulic fracturing operations, comprising:
- producing, using a generator, electricity at a voltage at a first well site;
- receiving the electricity at a power distribution system at the first well site without stepping up or stepping down the voltage; and
- transmitting the electricity, at the first well site, from the power distribution system to one or more pump trailers without stepping up or stepping down the voltage.

11. The method of claim 10, further comprising:
- transmitting the electricity from the first well site to a second well site; and
- operating one or more second pump trailers, at the second well site, with the electricity produced at the first well site without stepping up or stepping down the voltage.

12. The method of claim 11, further comprising:
- operating one or more fracturing support components, at the second well site, with the electricity produced at the first well site without stepping up or stepping down the voltage.

13. The method of claim 10, further comprising:
- transmitting the electricity, at the first well site, from the power distribution system to one or more second pump trailers without stepping up or stepping down the voltage.

14. The method of claim 10, wherein the voltage is at least one of 240V, 480V, 600 V, 4,160 V, or 13.8 kV.

15. The method of claim 10, further comprising:
- operating one or more fracturing support components, at the first well site, with the electricity produced at the first well site without stepping up or stepping down the voltage.

16. A hydraulic fracturing system, comprising:
- an electric pump electrically coupled to and receiving operative power from a power source;
- a power distribution circuit arranged between the electric pump and the power source, the power distribution circuit configured to provide electrical energy from the power source to the electric pump such that the electrical energy is not stepped up or stepped down between the power distribution circuit and the electric pump; and
- a variable frequency drive connected to a motor associated with the electric pump to control a speed of the motor.

17. The hydraulic fracturing system of claim 16, further comprising:
- a transformer; and
- auxiliary equipment, the auxiliary equipment receiving the electrical energy from at least one of the power distribution circuit or the power source after the voltage is stepped down by the transformer.

18. The hydraulic fracturing system of claim 16, further comprising:
- a blender unit receiving a fluid and proppant, the blender unit combining the fluid and proppant to form a slurry, and the blender unit receiving the electrical energy from the power distribution circuit at the voltage; and
- a hydration unit distributing the fluid to the blender unit, and the hydration unit receiving the electrical energy from the power distribution circuit at the voltage.

19. The hydraulic fracturing system of claim 16, wherein the electric pump comprises a plurality of electric pumps and the variable frequency drive comprises a plurality of variable frequency drives.

20. The hydraulic fracturing system of claim 16, wherein the voltage is at least one of 240V, 480V, 600 V, 4,160 V, or 13.8 kV.

* * * * *